(12) United States Patent
Takeyama

(10) Patent No.: US 6,512,635 B1
(45) Date of Patent: Jan. 28, 2003

(54) OBSERVATION OPTICAL SYSTEM AND PHOTOGRAPHING OPTICAL SYSTEM

(75) Inventor: Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 275 days.

(21) Appl. No.: 09/693,962

(22) Filed: Oct. 23, 2000

(30) Foreign Application Priority Data

Aug. 29, 2000 (JP) ........................................ 2000-264493

(51) Int. Cl.[7] .............................. G02B 27/14; G09G 5/00
(52) U.S. Cl. ........................ 359/638; 359/630; 359/631; 359/637; 359/720; 359/15; 359/737; 345/8; 250/494.1; 353/31
(58) Field of Search ................................. 359/737, 630, 359/631, 633, 637, 638, 627, 676, 720, 728, 15; 345/7, 8; 250/494.1, 221, 226; 353/31, 20

(56) References Cited

U.S. PATENT DOCUMENTS

| | | | | |
|---|---|---|---|---|
| 5,737,124 A | * | 4/1998 | Sarayeddine | 359/638 |
| 5,835,276 A | * | 11/1998 | Asai et al. | 359/638 |
| 6,122,080 A | * | 9/2000 | Ogata | 359/15 |
| 6,185,046 B1 | * | 2/2001 | Togino | 359/631 |
| 6,327,094 B1 | * | 12/2001 | Aoki | 359/637 |
| 6,342,980 B1 | * | 1/2002 | Omura | 359/638 |
| 6,396,639 B1 | * | 5/2002 | Togino et al. | 359/630 |

* cited by examiner

Primary Examiner—Loha Ben
(74) Attorney, Agent, or Firm—Pillsbury Winthrop LLP

(57) ABSTRACT

An observation optical system or a photographing optical system comprises, between a pupil surface and an image surface, a first prism 3 and a second prism. The first prism 3 includes a $1^{st}$-$1^{st}$ surface $3_1$ which has both of actions of transmitting and reflecting light in the path, a $1^{st}$-$2^{nd}$ surface $3_2$ which has both of actions of reflecting and transmitting the light in the path, and a $1^{st}$-$3^{rd}$ surface $3_3$ which transmits the light in the path. The second prism 4 includes a $2^{nd}$-$1^{st}$ surface $4_1$ which is disposed adjacent to the $1^{st}$-$2^{nd}$ surface $3_2$ at an air space away and which transmits the light in the path at least twice and a $2^{nd}$-$2^{nd}$ surface $4_2$ which reflects the light in the path. The $1^{st}$-$1^{st}$ surface $3_1$ is constructed of a prism face to which a volume hologram 6 is applied. Whereby, the observation optical system or photographing optical system can be made compact and lightweight enough to be incorporated into a portable telephone, a portable intelligent terminal, or a virtual-image observation system, and can provide bright images with high resolution.

66 Claims, 15 Drawing Sheets

| ——— 650.0 NM | ——— 540.0 NM | ——— 490.0 NM |
| -------- 630.0 NM | -------- 520.0 NM | -------- 470.0 NM |
| —--— 610.0 NM | —--— 500.0 NM | —--— 450.0 NM |

(EXAMPLE) WHERE MEDIUM IS AIR WITH n=1:
$$\Phi_0^{2P} = -r_2 - r_1 < 0$$

OBSERVATION OPTICAL SYSTEM AND PHOTOGRAPHING OPTICAL SYSTEM

BACKGROUND OF THE INVENTION

1) Field of the Invention

The present invention relates to an observation optical system and a photographing optical system. To be specific, it relates to an optical system used in an image display apparatus or a photographing apparatus, such as a camera, that can be held on the head or face of a user and that can be attached to a portable telephone or a portable intelligent terminal.

2) Description of Related Art

In recent years, development has been energetically made for image display apparatuses, specifically for those to be held on the head or face of individuals for entertaining them with a large image. Also, in accordance with recent popularization of portable telephone and portable intelligent terminal, requirements for large view of graphics or text data on these apparatuses have grown. Conventional art has proposed to convert a displayed image on a display surface of an image display device into a virtual image to be viewed by an observer using an optical system constructed of three transmitting or reflecting surfaces each of which assumes rotational asymmetry, as disclosed by Japanese Patent Application Preliminary Publication (KOKAI) Nos. Hei 8-234137, Hei 9-197336 and Hei 9-197337. Also, U.S. Pat. No. 5,959,781 proposes to introduce a displayed image on a display surface of an image display device into a concave mirror via a total-reflection surface or a beam splitter, so as to provide an enlarged virtual image to be viewed by an observer.

However, according to KOKAI Nos. Hei 8-234137, Hei 9-197336 and Hei 9-197337, since the prism is made of a single medium and thus compensating means for compensating the chromatic aberration of magnification is not provided, insufficient compensation of the chromatic aberration of magnification makes it difficult to achieve high resolution. Also, according to KOKAI Nos. Hei 9-197336 and Hei 9-197337, the prism is rendered large in the longitudinal direction (Y direction). According to U.S. Pat. No. 5,959,781, the apparatus is rendered expensive and assembly is complicated because of the large number of parts, as well as a prism medium having extremely poor birefringence property such as glass is employed to result in heavy weight of the apparatus, because a polarization beam splitter is employed as the beam splitter to utilize polarization characteristics, etc. Also, if plastic materials are used for the optical system to solve the problem of heavy weight, the beam splitter has to be a half mirror or the like because a polarization beam splitter cannot be employed. In this case, however, light from an electronic image is attenuated at the half mirror before it reaches the eye of the observer, and thus the visible image becomes dark.

SUMMARY OF THE INVENTION

An object of the present invention is to provide an optical system specifically used in an observation optical system or a photographing optical system, which is compact and lightweight enough to be incorporated into a portable telephone, a portable intelligent terminal, or a virtual image observation system, and which provides bright images with high resolution.

An optical system according to the basic configuration of the present invention comprises, between a pupil surface and an image surface, a first prism and a second prism. The first prism comprises a $1^{st}$-$1^{st}$ surface which is disposed on the pupil surface side and which has both of the action of transmitting first bundles of rays (defined as bundles of rays travelling along a path between the pupil surface and the image surface via the optical system) and the action of reflecting the first bundles of rays, a $1^{st}$-$2^{nd}$ surface which is disposed on the opposite side of the pupil surface with respect to the $1^{st}$-$1^{st}$ surface and which has both of the action of transmitting the first bundles of rays and the action of reflecting the first bundles of rays, and a $1^{st}$-$3^{rd}$ surface which is disposed on the image surface side and which transmits the first bundles of rays. The second prism comprises a $2^{nd}$-$1^{st}$ surface which is disposed adjacent to the $1^{st}$-$2^{nd}$ surface at an air space away and which transmits the first bundles of rays at least twice and a $2^{nd}$-$2^{nd}$ surface which is disposed on the opposite side of the pupil surface with respect to the $2^{nd}$-$1^{st}$ surface and which reflects the first bundles of rays. The $1^{st}$-$1^{st}$ surface is constructed of a prism face of the first prism to which a holographic element is applied. The holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays. The $1^{st}$-$2^{nd}$ surface of the first prism is constructed and arranged such that a part of effective rays are incident thereon at angles greater than the critical angle so as to be totally reflected therefrom and a remaining part of the effective rays are incident thereon at angles equal to or smaller than the critical angle so as to be transmitted therethrough, to thereby have both of the action of reflecting the first bundles of rays and the action of transmitting the first bundles of rays.

According to the present invention in general, at least one surface of the first or second prism, specifically a surface having reflecting action, is rotationally asymmetric.

Also, a rotationally asymmetric surface used in the optical system of the present invention may be constructed of an anamorphic surface, a toric surface, a free curved surface that defines only one plane of symmetry. The free curved surface that defines only one plane of symmetry is particularly preferred.

Also, in the optical system according to the present invention, the prism face of the first prism is shaped as a plane base surface and the holographic element is applied to the plane base surface, to form the $1^{st}$-$1^{st}$ surface.

Alternatively, the prism face of the first prism is shaped as a curved base surface and the holographic element is applied to the curved base surface, to form the $1^{st}$-$1^{st}$ surface.

In this case, the curved base surface may be shaped as any one of a cylindrical surface, a spherical surface, an aspherical surface, an anamorphic surface, a toric surface, a surface that defines only one plane of symmetry, and a plane-symmetric free curved surface.

Also, according to the present invention, the holographic element applied to the $1^{st}$-$1^{st}$ surface is constructed of a volume hologram, which preferably has a rotationally asymmetric power.

Also, according to the present invention, the $1^{st}$-$2^{nd}$ surface of the first prism and the $2^{nd}$-$1^{st}$ surface of the second prism are congruently shaped so that a path of rays can be formed such that chromatic aberration of the first bundles of rays passing through the air space between the $1^{st}$-$2^{nd}$ surface and the $2^{nd}$-$1^{st}$ surface is prevented from being degraded.

In this case, the $1^{st}$-$2^{nd}$ surface of the first prism and the $2^{nd}$-$1^{st}$ surface of the second prism may be shaped as plane surfaces or alternatively, as curved surfaces.

In this case, the following Condition (1) is satisfied:

$$1\times10^{-3} \text{ (mm)} < M < 3 \text{ (mm)} \tag{1}$$

where M is the air space between the $1^{st}$-$2^{nd}$ surface of the first prism and the $2^{nd}$-$1^{st}$ surface of the second prism.

It is much preferred that the following Condition (2) is satisfied:

$$1\times10^{-2} \text{ (mm)} < M < 2 \text{ (mm)} \tag{2}$$

It is still much preferred that the following Condition (3) is satisfied:

$$7\times10^{-1} \text{ (mm)} < M < 1.5 \text{ (mm)} \tag{3}$$

Also, according to the present invention, a surface having both of the refracting action and the reflecting action, such as the $1^{st}$-$2^{nd}$ surface, is preferably formed as a rotationally asymmetric surface. However the surface may be formed as a rotationally symmetric surface such as a spherical surface and an aspherical surface.

Also, according to the present invention, at least one of the $1^{st}$-$2^{nd}$ surface of the first prism and the $2^{nd}$-$1^{st}$ surface of the second prism is provided with an anti-reflection coating so as to prevent generation of a ghost.

The optical system having the above-described basic configuration and the additional features is applicable to an observation optical system. That is, an observation optical system according to the present invention comprises the above-described optical system and an image display element disposed on the image surface to display thereon an image to be viewed by an observer. An exit pupil is formed on the pupil surface so that an eye of the observer is positioned thereat. The observation optical system is constructed and arranged so that the first bundles of rays emergent from the image display element enter the first prism as being transmitted through the $1^{st}$-$3^{rd}$ surface, are then totally reflected from the $1^{st}$-$2^{nd}$ surface, are then reflected from the $1^{st}$-$1^{st}$ surface by diffraction, then exit from the first prism as being transmitted through the $1^{st}$-$2^{nd}$ surface, then enter the second prism as being transmitted through the $2^{nd}$-$1^{st}$ surface, are then reflected from the $2^{nd}$-$2^{nd}$ surface, then exit from the second prism as being transmitted through the $2^{nd}$-$1^{st}$ surface, then re-enter the first prism as being transmitted through the $1^{st}$-$2^{nd}$ surface, and then exit from the first prism as being transmitted through the $1^{st}$-$1^{st}$ surface, to be introduced to the exit pupil.

Therefore, for example, in a virtual image observation apparatus which forms an exit pupil for observation of an electronic image displayed on an image display element and which has a positive refractive power in its entirety, the observation optical system according to the present invention is constructed so that the first prism includes a rotationally asymmetric refracting surface, a rotationally symmetric or rotationally asymmetric surface having actions of total reflection and transmission, a surface which includes a cylindrical base surface or a plane base surface and a volume hologram element arranged thereon and which is disposed on the exit pupil side and that the second prism includes a rotationally symmetric or rotationally asymmetric entrance surface and a rotationally symmetric or rotationally asymmetric reflecting surface.

Also, in the observation optical system according to the present invention, the image display element is arranged such that the following condition (4) is satisfied:

$$40(°) < |\theta| < 100(°) \tag{4}$$

where θ is an angle formed between a perpendicular to a display surface of the image display element and a visual axis, which is defined to be an axial chief ray as it passes through the exit pupil, the axial chief ray being defined to be a ray travelling between the center of the pupil surface and the center of the image surface.

It is much preferred that the following condition (5) is satisfied:

$$60(°) < |\theta| < 85(°) \tag{5}$$

It is still much preferred that the following condition (6) is satisfied:

$$65(°) < |\theta| < 73(°) \tag{6}$$

Also, in the observation optical system of the present invention, the $2^{nd}$-$2^{nd}$ surface of the second prism maybe constructed and arranged such that a part of effective rays are incident thereon at angles greater than the critical angle so as to be totally reflected therefrom and that a remaining part of the effective rays are incident thereon at angles equal to or smaller than the critical angle so as to be transmitted therethrough.

In this case, the observation optical system may further include an optical member which transmits light and which is disposed on a side of the $2^{nd}$-$2^{nd}$ surface. This optical member is made of a transparent material such as glass or plastic.

Also, according to the present invention, the observation optical system may further include an optical member, such as a prism, a plane parallel glass plate and a positive or negative lens, disposed between the $1^{st}$-$3^{rd}$ surface of the first prism and the image display element.

Also, according to the present invention, the observation optical system may further include an optical member, such as a prism, a plane parallel glass plate and a positive or negative lens, disposed between the $1^{st}$-$1^{st}$ surface of the first prism and the exit pupil.

Also, in the observation optical system according to the present invention, the first prism may further include a reflecting surface arranged in a path from the $1^{st}$-$3^{rd}$ surface to the $1^{st}$-$2^{nd}$ surface so as to direct the first bundles of rays to the $1^{st}$-$2^{nd}$ surface by reflection.

Also, in the observation optical system according to the present invention, the second prism may further include a reflecting surface arranged in a path from the $2^{nd}$-$1^{st}$ surface to the $2^{nd}$-$2^{nd}$ surface so as to direct the first bundles of rays to the $2^{nd}$-$2^{nd}$ surface by reflection.

Also, in the observation optical system according to the present invention, the optical system is preferably enclosed in a dust shield member. The dust shield member preferably includes a case which accommodates the optical system and a transparent cover which transmits light traveling in the path between the first prism the exit pupil. Glass or plastic may be employed as the mazztterial of the transparent cover.

The observation optical system having the above-described basic configuration and the additional features is applicable to a head-mount image display apparatus. That is, a head-mount image display apparatus according to the present invention includes a main frame in which the above-described observation optical system is arranged as an eyepiece optical system, a support member which holds the main frame to the head of the observer so that the exit pupil of the observation optical system coincides with an eye of the observer, and a speaker member to provide a voice for an ear of the observer.

Also, the application can be modified so that a head-mount image display apparatus includes a main frame in which a pair of observation optical systems each being configured as described above are arranged, a support member which holds the main frame to the head of the observer so that the exit pupils of the observation optical systems coincide with a left eye and a right eye of the observer, respectively, and a pair of speaker members which provide voices for a left ear and a right ear of the observer, respectively.

Also, in the head mount display apparatus according to the present invention, the speaker member may be constructed of an earphone.

The optical system having the above-described basic configuration and the additional features is applicable not only to the observation optical system but also to a photographing optical system. A photographing optical system according to the present invention comprises the optical system having the above-described features, an image pickup element disposed on the image surface for photographing an image of an object, and an aperture stop disposed on the pupil surface for regulating brightness of the bundles of rays emergent from the object. The photographing optical system is constructed and arranged so that the light from the object passing through the aperture stop enters the first prism as being transmitted through the $1^{st}$-$1^{st}$ surface, once exits from the first prism as being transmitted through the $1^{st}$-$2^{nd}$ surface, then enters the second prism as being transmitted through the $2^{nd}$-$1^{st}$ surface, is then reflected from the $2^{nd}$-$2^{nd}$ surface, then exits from the second prism as being transmitted through the $2^{nd}$-$1^{st}$ surface, then re-enters the first prism as being transmitted through the $1^{st}$-$2^{nd}$ surface, is then reflected by diffraction from the $1^{st}$-$1^{st}$ surface, is then totally reflected from the $1^{st}$-$2^{nd}$ surface, and then exits from the first prism as being transmitted through the $1^{st}$-$3^{rd}$ surface, to be introduced to the image pickup element.

In other words, if the image display element and the exit pupil of the above-described observation optical system are replaced by the image pickup element and the aperture stop, respectively, the photographing optical system is constructed.

It is preferred that the photographing optical system also is provided with the above-described additional features of the observation optical system, such as the numerical conditions (4), (5), (6).

Furthermore, in the photographing optical system according to the present invention, liquid is employed as a medium of the second prism and a reflecting surface included in the second prism is formed as a deformable mirror, so that the second prism acts as a focusing system.

This and other objects as well as features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
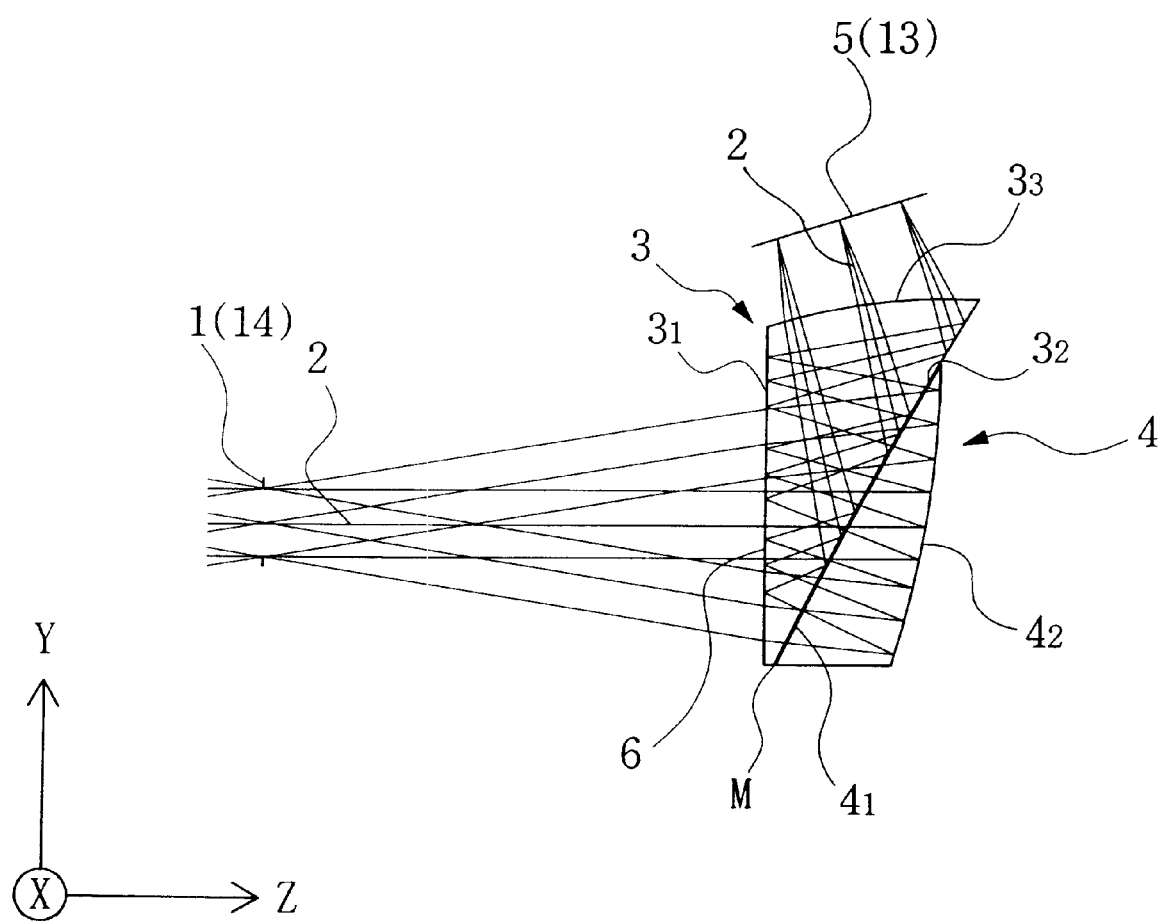
FIG. 1 is a sectional view of an optical system according to the first embodiment of the present invention taken along a Y-Z plane in which the optical axis lies.

First, preceding the descriptions of the individual embodiments, explanation will be made of the reasons and functions of the before-summarized features of the present invention.

The optical system according to the present invention is configured so that the path of rays is folded several times in the prisms. For example, the prism region between the $1^{st}$-$1^{st}$ surface and the $1^{st}$-$2^{nd}$ surface is traversed by the first bundles of rays three times. Such an arrangement contributes to size reduction of the optical system in the thickness direction (Z direction) and the longitudinal direction (Y direction). However, if none of the reflecting surfaces in such a system is decentered from an axial chief ray, the path of the axial chief ray incident on the reflecting surfaces coincides with the path of the axial chief ray reflected therefrom and thus the axial chief ray is interrupted in the optical system. (Here, in the optical system of the present invention, the axial chief ray is defined as a ray travelling from the center of the pupil surface through the center of the image surface. That is, the reverse ray tracing from the exit pupil to the image display element is made in the case of the observation optical system, and the normal (forward) ray tracing from the aperture stop to the image pickup element is made in the case of the photographing optical system.) As a result, a light beam with its central portion being interrupted is used for image formation and thus the image becomes dark at its center or the image formation is completely failed at the center.

Therefore, according to the present invention, at least one reflecting surface is decentered from the axial chief ray. In other words, according to the present invention, decentered prisms are employed.

As discussed above, according to the present invention, the optical system is required to be decentered because a common region for the path is repeatedly traversed. However, where the decentered optical system for folding the path is employed, particularly where a reflecting surface having a power is decentered, decentered aberrations such as the rotationally asymmetric distortion and the rotationally asymmetric curvature of field could be produced.

Therefore, according to the present invention in general, at least one surface, specifically a surface having reflecting action, is constructed to be rotationally asymmetric for the purpose of compensating the rotationally asymmetric aberrations caused by the decentered arrangement of the optical system.

According to the present invention, the $1^{st}$-$1^{st}$ surface of the first prism is constructed of a base surface and a holographic element applied thereto. The holographic element preferably is a volume hologram having a rotationally asymmetric power because, even if the base surface is shaped as a plane surface, the $1^{st}$-$1^{st}$ surface can have the rotationally asymmetric power, to compensate a rotationally asymmetric chromatic aberration of magnification generated at a curved surface disposed decentered from the optical axis. As a result, image display with high resolution can be realized.

In is generally known that a diffraction optical element having a large diffraction angle is required to have a fine pitch of grating structure in the element and thus fabrication of it is difficult. However, since the volume hologram element according to the present invention is used for the purpose of dividing the path and for compensating the chromatic aberration of magnification, it is allowed to have small optical power with the reflecting diffraction angle being substantially same as the regular reflection angle and thus can be fabricated with ease.

A photosensing material that is formed as a plane film to be used for a volume hologram element can be relatively easily bent to have a cylindrical shape. However, it is difficult to process it to conform to the shape of the base surface having curvature both in X direction and Y direction.

According to the present invention, if the volume hologram is arranged on a plane base surface, the structure that allows easy production can be realized.

Alternatively, according to the present invention, the base surface of the $1^{st}$-$1^{st}$ surface of the first prism may be shaped as a curved surface. If the volume hologram is applied to a cylindrical base surface, for example, compensation of distortion in Y direction can be improved and telecentricity in Y direction can be compensated.

However, if the base surface on the pupil side on which the volume hologram is arranged is shaped plane or cylindrical considering the fabrication convenience discussed above, the power for compensating decentered aberrations is not sufficient as to realize an optical system with good quality regarding compensation of rotationally asymmetric distortion and telecentricity.

Therefore, according to the present invention, an air space is provided between the first prism and the second prism. The prism surfaces that are adjacent to the air space act as air gap surfaces having an optical power so as to achieve an optical system with good quality regarding compensation of rotationally asymmetric distortion and telecentricity.

In this case, the air gap surfaces between the first and second prisms (i.e. the $1^{st}$-$2^{nd}$ surface and the $2^{nd}$-$1^{st}$ surface) may be constructed of different kinds of surfaces or the same kind of surfaces with different shapes for further compensation of decentered aberrations. However, if they are constructed of the same kind of surfaces with the same shape, geometrical arrangement of the surfaces can be easily designed.

For example, if the $1^{st}$-$2^{nd}$ surface of the first prism and the $2^{nd}$-$1^{st}$ surface of the second prism are congruently shaped, a path of rays can be formed such that chromatic aberration of the first bundles of rays passing through the air space between the $1^{st}$-$2^{nd}$ surface and the $2^{nd}$-$1^{st}$ surface is not degraded.

In this case, the $1^{st}$-$2^{nd}$ surface of the first prism and the $2^{nd}$-$1^{st}$ surface of the second prism may be shaped as plane surfaces or alternatively, as curved surfaces.

In this case, it is preferred that Condition (1) is satisfied.

Theoretically, it is desirable to set the air space M between the $1^{st}$-$2^{nd}$ surface and the $2^{nd}$-$1^{st}$ surface as narrow as possible for the purpose of reducing lateral shift of the path caused by refraction. However, if the air space M is below the lower limit of Condition (1), the mechanical structure does not allow the first prism and the second prism to be set with such a small space between and thus appropriate arrangement in the apparatus cannot be achieved. On the other hand, if the air space M exceeds the upper limit of Condition (1), the large amount of lateral shift of the path requires the second prism to be larger or to be shifted in the direction of the lateral shift of the path for the purpose of assuring a sufficiently large effective diameter of the light beam. As a result, the optical system fails to be compact, which is undesirable.

Also, it is much preferred that Condition (2) is satisfied. Furthermore, it is still much preferred that Condition (3) is satisfied.

Also, according to the present invention, a surface having both of the refracting action and the reflecting action, such as the $1^{st}$-$2^{nd}$ surface, is preferably formed as a rotationally asymmetric surface for the purpose of achieving an optical system with good quality regarding compensation of rotationally asymmetric distortion and telecentricity. However the surface may be formed as a rotationally symmetric surface such as a spherical surface and an aspherical surface.

As described above, according to the present invention, the air gap surfaces are provided between the first prism and the second prism. Bundles of rays which enter the first prism is made incident on the air gap surface at angles larger than the critical angle, which is determined by difference between the refractive index of the prism medium and the refractive index of the air interface, to be reflected therefrom upon satisfying the total reflection condition. The bundles of rays totally reflected thereat are again incident on the same total reflection surface after being reflected from the volume hologram surface by diffraction. However, this time, the total reflection condition is not satisfied and thus the bundles of rays are emergent toward the second prism.

The bundles of rays which enter the second prism are emergent from the incident surface of the second prism again after being refracted and reflected by the rotationally asymmetric incident surface and the reflecting surface, to re-enter the first prism. The bundles of rays which re-enter the first prism are again incident on the volume hologram surface at angles largely different from those in the case of the previous reflecting diffraction. This time, since the incident angles are out of the range of angular selectivity of the volume hologram, diffraction efficiency is extremely low and thus the bundles of rays substantially pass through the surface, to be introduced to the eye of the observer.

Therefore, according to the present invention, since the total reflection surface and the volume hologram element are adopted to selectively use the action of reflection and the action of transmission, a polarization beam splitter is dispensable for path dividing and thus plastic materials, which in general have larger birefringence property than optical glass, can be used to form prism members. Consequently, a virtual image observation apparatus or the like that is lightweight can be provided at high productivity. Moreover, since a half mirror also is unnecessary for path dividing, the apparatus can provide an observer a bright electronic image with small loss of amount of light.

Furthermore, according to the present invention, since the prism region between the surface having both of total reflection action and transmission action and the surface having the volume hologram is traversed by the first bundles of rays three times, the optical system can have a small size in the thickness direction (Z direction) and the longitudinal direction (Y direction).

Figure 21:
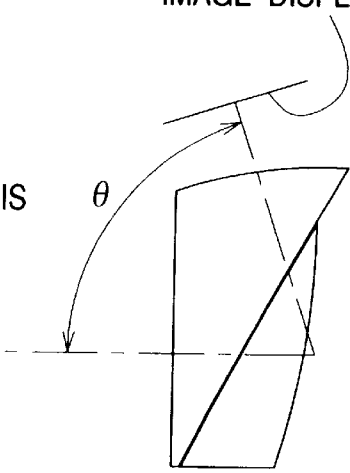
FIG. 21 an illustration showing the definition of angle θ in an optical system according to the present invention.

Also, where the present invention is applied to an observation optical system, it is important to arrange the image display element such that the absolute value of angle θ between a perpendicular to a display surface of the image display element and the visual axis, which is defined to be the axial chief ray as it passes through the exit pupil, satisfies Condition (4) (See FIG. 21).

If the absolute value of θ exceeds the upper limit of Condition (4), tilt angle of the total reflection surface ($1^{st}$-$2^{nd}$ surface) becomes large and accordingly the thickness (size in Z direction) of the optical system becomes large. In addition, amount of decentering of the reflecting surface ($2^{nd}$-$2^{nd}$ surface) of the second prism becomes large and accordingly compensation of decentered aberrations becomes difficult. On the other hand, if the absolute value of θ is below the lower limit of Condition (4) it becomes difficult that the total reflection condition determined the critical angle at the total reflection surface ($1^{st}$-$2^{nd}$ surface) is satisfied.

It is much preferred that Condition (5) is satisfied. It is still much preferred that Condition (6) is satisfied.

Also, where the present invention is applied to an observation optical system, the $2^{nd}$-$2^{nd}$ surface of the second prism may be constructed and arranged such that a part of effective rays are incident thereon at angles greater than the critical angle so as to be totally reflected therefrom and that a remaining part of the effective rays are incident thereon at angles equal to or smaller than the critical angle so as to be transmitted therethrough. In this case, the observation optical system may further include an optical member which transmits light and which is disposed on a side of the $2^{nd}$-$2^{nd}$ surface.

This configuration allows an observer to perform see-through observation. The observer can carry on wearing a head- or face-mount type image display apparatus using the observation optical system of the present invention without sacrificing the view of external real environment. In short, the observer is not bothered to take off and on the apparatus during use.

This configuration is applicable to image superposition mode where an image from the image display element and an image from the external environment can be simultaneously viewed as overlapped images.

Also, the optical system of the present invention is preferably enclosed in a dust shield member. This configuration prevents dust or the like from being visible as an enlarged image. Also, in the first prism having the holographic element, the dust shield member can prevent that the holographic element changes its characteristic regarding the peak wavelength for diffraction by absorbing water from outside.

Now, description will be made of detail structure and arrangement of the optical surfaces used in the present invention.

In reference to FIG. 1 for example, an axial chief ray 2 is defined as a ray travelling from the center of a pupil surface (the center of an exit pupil 1 (i.e. the rotation center of an eyeball of an observer) or the center of an aperture stop 14) to the center of an image surface (the center of an LCD 5 which is provided as an image display element or the center of an image pickup element 13) via a first prism 3 and a second prism 4. Z axis is defined by the straight line portion of the axial chief ray 2 from the pupil surface to the pupil side surface ($1^{st}$-$1^{st}$ surface) $3_1$ of the first prism 3. Y axis is defined as an axis that intersects Z axis at right angles and lies in a plane of decentering for each surface constituting the prisms. X axis is defined as the axis that intersects Z axis and Y axis at right angles. In the XYZ coordinate system, the origin is taken at the center of the exit pupil 1 (aperture stop 14). The direction along the axial chief ray 2 from the exit pupil 1 (aperture stop 14) to the surface $3_1$ is defined as a positive direction of Z axis. The positive direction of Y is substantially along the direction of the axial chief ray 2 from the surface $3_3$ to the LCD 5 (image pickup element 13). A direction of X axis which forms a right hand system along with the Y axis and Z axis is defined as a positive direction of X axis.

Configuration of the free curved surface used in the present invention is defined by the following equation (7) where Z axis appearing therein is the axis of the free curved surface:

$$Z = cr^2 / \{1 + \sqrt{1-(1+k)c^2r^2}\} + \sum_{j=2}^{66} c_j X^m Y^n \quad (7)$$

The first term of Equation (7) expresses the spherical component. The second term of Equation (7) expresses the free curve component. In the term of the spherical component, c represents a curvature at the vertex, k represents a conic constant, and $r=\sqrt{X^2+Y^2}$.

The term of the free curve component is expanded as shown in the following Equation (8):

$$\sum_{j=2}^{66} C_j X^m Y^n = C_2 X + C_3 Y + C_4 X^2 + C_5 XY + C_6 Y^2 + C_7 X^3 + \quad (8)$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane. Such a free curved surface is obtained by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ ... of the terms at zero. Alternatively, upon all terms with odd-numbered powers of y being nullified, the free curved surface can define only one plane of symmetry that is parallel to X-Z plane. Such a free curved surface is obtained by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ ... of the terms at zero.

According to the present invention, a free curved surface that defines one of the above-mentioned planes of symmetry is arranged so that its plane of symmetry extends along the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate rotationally asymmetric aberrations caused by decentering and to improve facility for fabrication.

Equation (7) is shown as one example that can define the configuration of a free curved surface. Even if the free curved surface having only one plane of symmetry according to the present invention is defined by any different expression, it is still effective in compensation of rotationally asymmetric aberrations caused by decentering and in improvement of facility for fabrication, as a matter of course.

As discussed above, according to the present invention, a reflecting surface of the prism member can be shaped as a plane-symmetric free curved surface defining only one plane of symmetry.

Configuration of an anamorphic surface is defined by the following equation (9). The normal to the optical surface at the origin of the surface shape is defined as the axis of the anamorphic surface.

$$Z = \quad (9)$$
$$(C_x \cdot X^2 + C_y \cdot Y^2)/[1 + \{1-(1+K_x)C_x^2 \cdot X^2 -(1+K_y)C_y^2 \cdot Y^2\}^{1/2}] +$$
$$\sum R_n \{(1-P_n)X^2 + (1+P_n)Y^2\}^{(n+1)}$$

Here, if it is assumed that n is from 1 to 4 (polynomial of degree 4), for example, Equation (9) is expanded as the following expression (10):

$$Z = (C_x \cdot X^2 + C_y \cdot Y^2)/ \quad (10)$$
$$[1 + \{1-(1+K_x)C_x^2 \cdot X^2 -(1+K_y)C_y^2 \cdot Y^2\}^{1/2}] +$$
$$R_1\{(1-P_1)X^2 + (1+P_1)Y^2\}^2 + R_2\{(1-P_2)X^2 + (1+P_2)Y^2\}^3 +$$
$$R_3\{(1-P_3)X^2 + (1+P_3)Y^2\}^4 + R_4\{(1-P_4)X^2 + (1+P_4)Y^2\}^5$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$, and $C_y$, respectively, as follows:

$R_x = 1/C_x$, $R_y = 1/C_y$.

Regarding the toric surface, there are two kinds; i.e. X toric surface and Y toric surface, which are expressed by the following equations (11), (12), respectively. The normal to the optical surface at the origin of the surface shape is defined as the axis of the toric surface.

Configuration of X toric surface is defined as follows:

$$F(X) = C_x \cdot X^2 / [1 + \{1-(1+K)C_x^2 \cdot X^2\}^{1/2}] + \quad (11)$$
$$AX^4 + BX^6 + CX^8 + DX^{10} \ldots$$
$$Z = F(X) + (1/2)C_y\{Y^2 + Z^2 - F(X)^2\}$$

Configuration of Y toric surface is defined as follows:

$$F(Y) = C_y \cdot Y^2 / [1 + \{1-(1+K)C_y^2 \cdot Y^2\}^{1/2}] + \quad (12)$$
$$AY^4 + BY^6 + CY^8 + DY^{10} \ldots$$
$$Z = F(Y) + (1/2)C_x\{X^2 + Z^2 - F(Y)^2\}$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Regarding the holographic element, there are two types; i.e. a relief hologram and a volume hologram. The relief hologram has the property of low selectivity regarding incident angle and low selectivity regarding wavelength. Thus, such a type of hologram diffracts rays with a particular wavelength incident thereon at a particular angle and images them as desired diffraction order rays, while diffracting, at a low diffraction efficiency, other rays with different wavelengths incident thereon at different angles and imaging them as undesired order rays. In contrast, the volume hologram has the property of high selectivity with respect to incident angle and high selectivity with respect to wavelength. Thus, such a type of hologram exclusively diffracts rays with a particular wavelength incident thereon at a particular angle, while transmitting the remaining rays as zero order rays so that undesired order rays should hardly be imaged.

Therefore, if a reflecting volume hologram is used as the holographic element of the first prism as in the present invention, image blur because of undesired order rays is obviated, and thus a clear image can be provided for observation.

The volume hologram used as a holographic element (HOE) in the present invention is defined as follows in reference to FIG. 22, which shows the principle of defining HOE according to the present invention.

Ray tracing for a ray with wavelength $\lambda$ incident on and emergent from any point P on the HOE surface is given by the following equation (13):

$$n_d Q_d \cdot N = n_i Q_i \cdot N + m(\lambda/\lambda_0)\nabla \Phi_0 \cdot N \quad (13)$$

where N is a vector of the normal to the HOE surface, $n_i$ is a refractive index on the incident side, $n_d$ is a refractive index on the emergent side, $Q_i$ is a vector of incidence, $Q_d$ is a vector of emergence, m=HOR is a diffraction order of emergent light, and $\Phi_0$ is the optical path difference function which is defined for a reference wavelength $\lambda_0$=HWL on the HOE surface.

Figure 22:
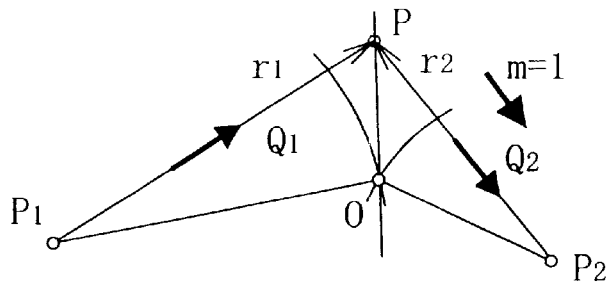
FIG. 22 is a view to show the principle of defining HOE according to the present invention.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$=(HX2, HY2, HZ2) as shown in FIG. 22, the following equation is satisfied:

$$\Phi_0 = \Phi_0^{2P}$$
$$= n_2 \cdot s_2 \cdot r_2 - n_1 \cdot s_1 \cdot r_1$$

where $r_1$ ($r_2$) is a distance (>0) from the point $P_1$ ($P_2$) to a predetermined coordinate point (i.e. the origin) O on the HOE, $n_1$ ($n_2$) is a refractive index of the point $P_1$ ($P_2$)-side medium by which the HOE was arranged during fabrication (definition), $s_1$=HV1, and $s_2$=HV2 are signs to take into consideration the travelling direction of light. In the case where the light source is a divergent source (real point source), the sign is set to be REA=+1, while in the case where the light source is a convergent light source (virtual light source), the sign is set to be VIR=−1. Also, in FIG. 22, $Q_1$ is a unit vector of the ray emergent from the point light source $P_1$, which is a divergent light source, and incident at the given point P on the HOE, and $Q_2$ is a unit vector of the ray traversing the point P and converging on the point light source $P_2$, which is a virtual light source. Note that in defining a HOE in lens data, the refractive index $n_1$ ($n_2$) of the medium in which the HOE was arranged during fabrication is the refractive index of the medium which interfaces with HOE on the side of the point $P_1$ ($P_2$)

In general cases, reference rays and object rays used to fabricate a HOE are not limited to spherical waves. In these cases, the optical path difference function $\Phi_0$ of HOE can be defined by the following equation (14) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \quad (14)$$

The polynomial $\Phi_0^{Poly}$ is given by:

$$\Phi_0^{Poly} = \sum_j H_j \cdot x^m \cdot y^n$$
$$= H_1 x + H_2 y + H_3 x^2 + H_4 xy + H_5 y + H_6 x^3 + H_7 x^2 y + H_8 xy^2 + H_9 y^3 + \ldots$$

and can be defined, in general, by:

$$j=\{(m+n)^2+m+3n\}/2$$

where $H_j$ is the coefficient of each term.

Furthermore, for convenience in optical designing, the optical path difference function $\Phi_0$ may be expressed only by the additional term as follows:

$$\Phi_0=\Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

It is noted that the above descriptions regarding HOE are made in reference to a local coordinate system determined by the HOE origin.

An example of the parameter set to define the HOE is shown below:

| Surface Arrangement No. | Radius of Curvature | Surface Separation |
|---|---|---|
| object surface | ∞ | ∞ |
| stop | ∞ | 100 |
| 2 | 150 | −75 |

Figure 23:
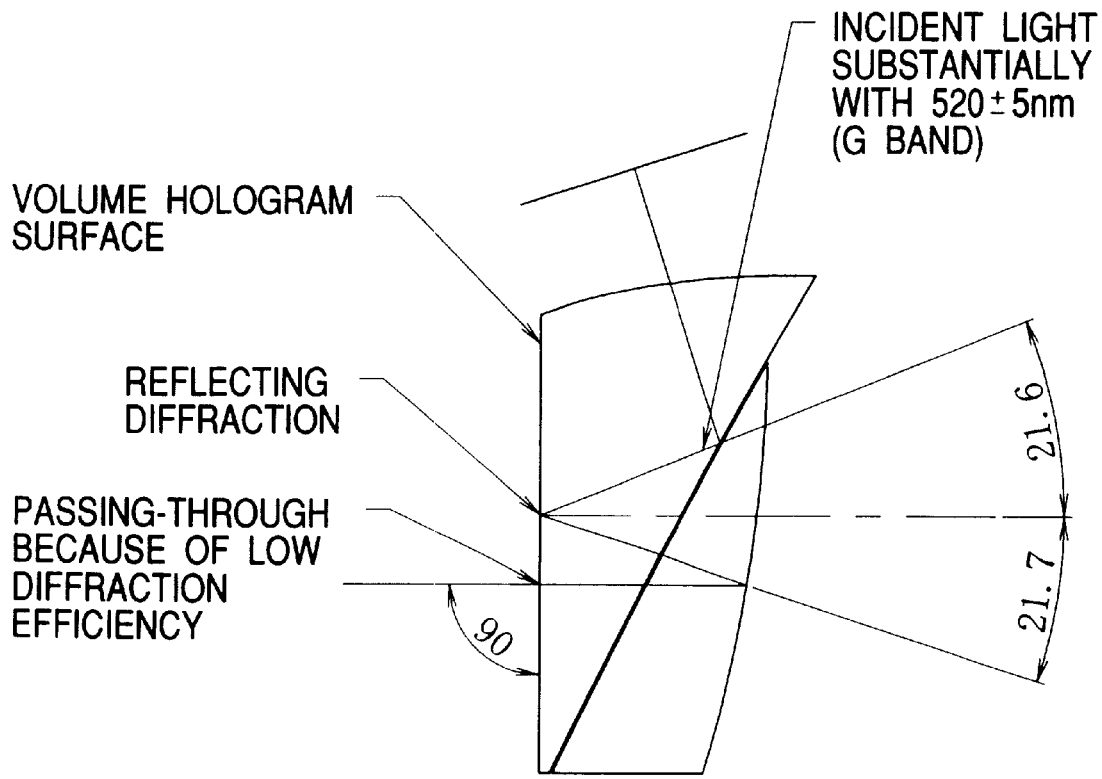
FIG. 23 is an explanatory view to show the calculation conditions of diffraction efficiency at the volume hologram surface according to the present invention.
Figure 24:
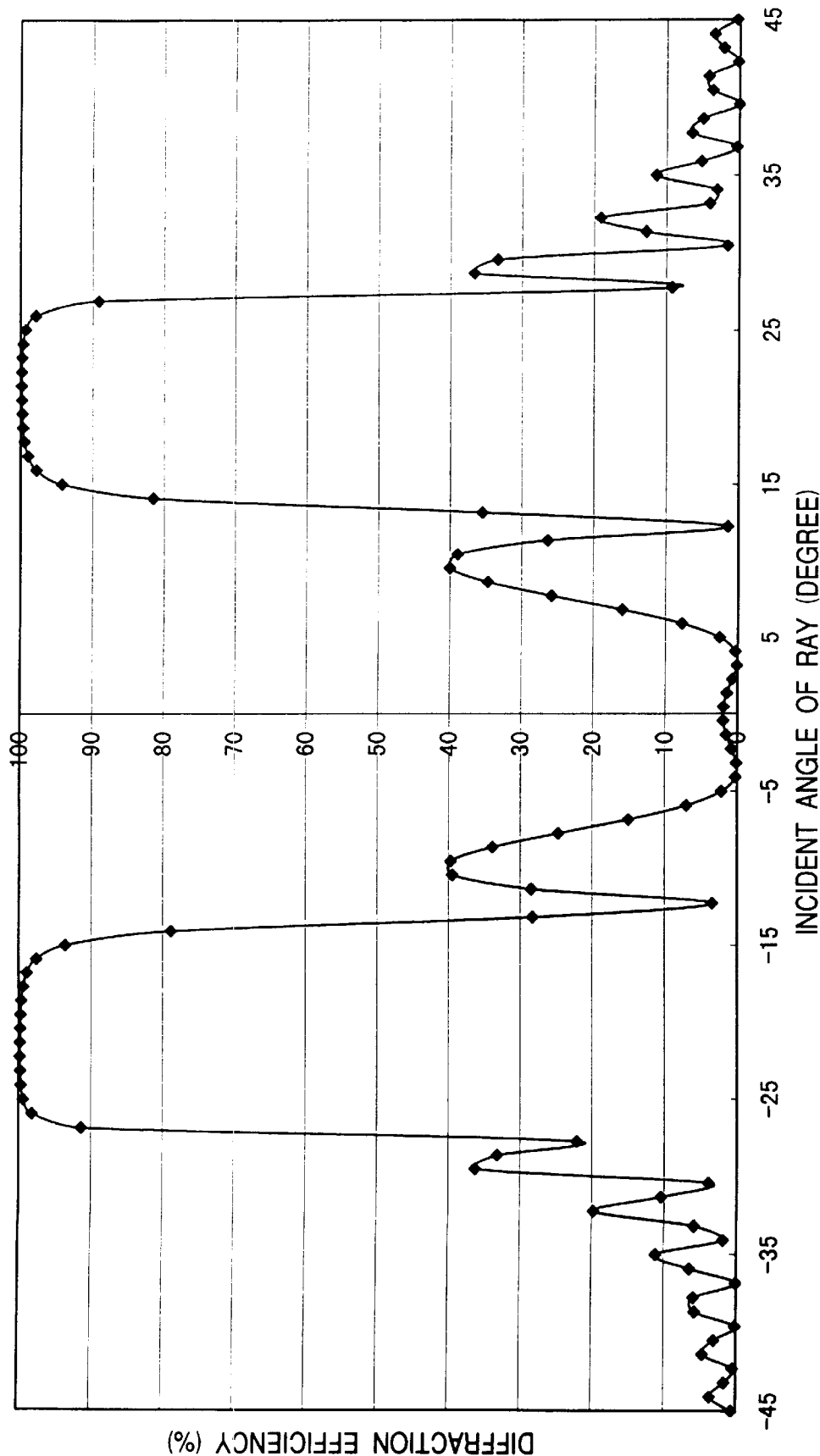
FIG. 24 is a graph in which the diffraction efficiency at the volume hologram surface of the present invention for the axial chief ray with the wavelength of 520 nm is plotted against the incident angle.
Figure 25:
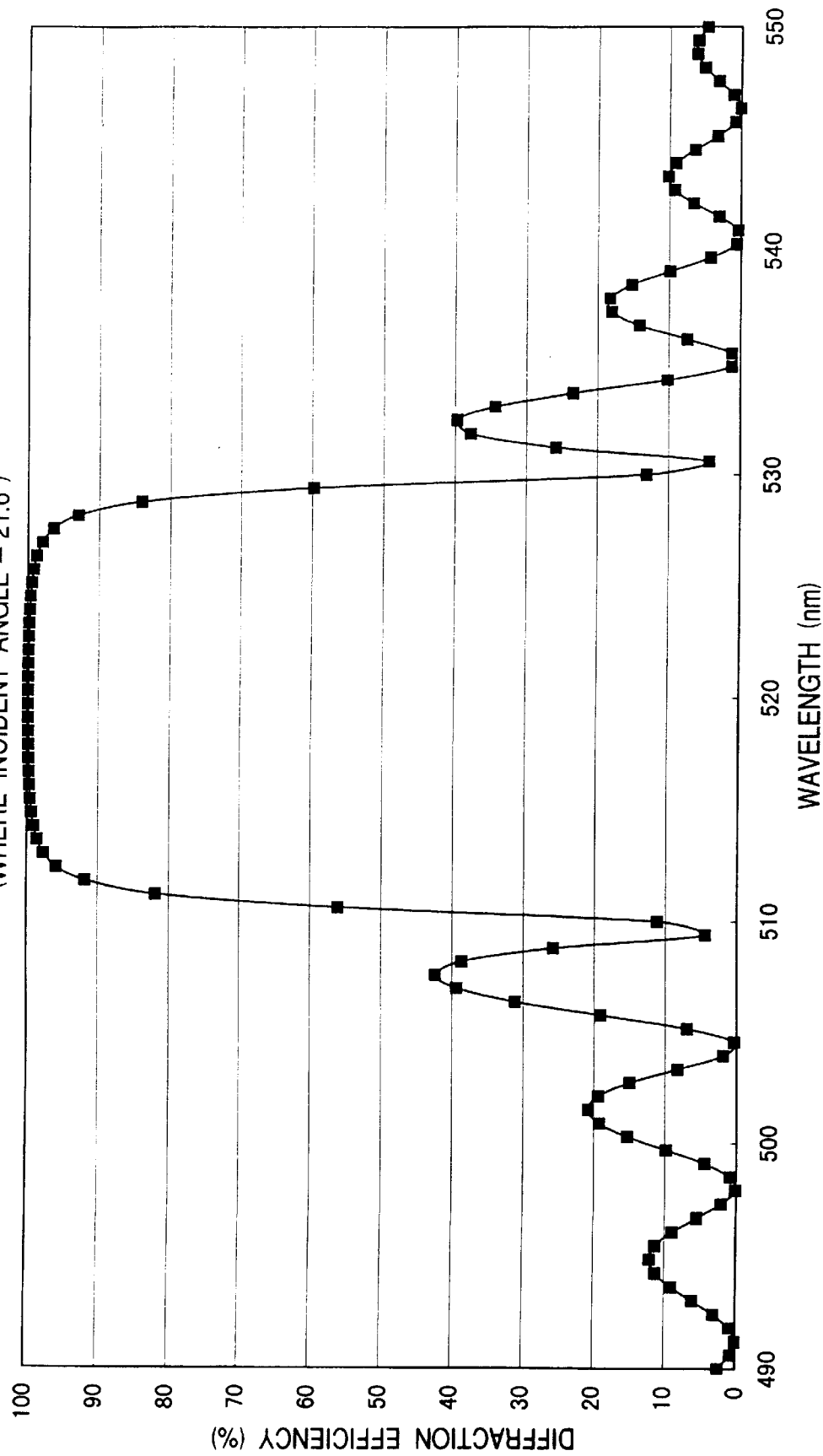
FIG. 25 is a graph in which the diffraction efficiency at the volume hologram surface of the present invention for the axial chief ray forming the incident angle of 21.6° is plotted against the wavelength.

HOE:
HV1 ($s_1$) = REA (+1)
HV2 ($s_2$) = VIR (−1)
HOR (m) = 1
HX1 = 0, HY1 = −3.40 × 10$^9$, HZ1 = −3.40 × 10$^9$
HX2 = 0, HY2 = 2.50 × 10, HZ2 = −7.04 × 10
HWL ($\lambda_0$) = 544
$H_1$ = −1.39 × 10$^{-21}$  $H_2$ = −8.57 × 10$^{-5}$  $H_3$ = −1.50 × 10$^{-4}$ Now, descriptions will be made of the principle of reflecting diffraction and transmission caused at the surface of the volume hologram used in the present invention. A result of a simulation regarding the diffraction efficiency is discussed. The simulation is performed based on the theory of Kogelnik, specifically in terms of diffraction efficiency for P-polarized component. FIG. 23 shows the conditions under which the calculation is made. As light sources for R, G, B bands, LED light sources having center wavelengths of 630 nm, 520 nm, and 470 nm, respectively, are employed. Each of the LCDs is combined with a narrow-band filter so that its band width is limited substantially within ±(5 nm–10 nm) from the center wavelength. As an example, the inventor presents the calculation result of diffraction efficiency at the volume hologram surface for the axial chief ray of G band, which is obtained based on the assumption that the reference refractive index is 1.5 and the refracting diffraction angle is 0.05°. The diffraction efficiency in the case where the incident angle of the axial chief ray is 21.6° and the reflecting diffraction angle of 21.7° is shown in FIGS. 24, 25. In FIG. 24, the diffraction efficiency for the axial chief ray with the wavelength of 520 nm is plotted against the incident angle. In FIG. 25, the diffraction efficiency for the axial chief ray forming the incident angle of 21.6° is plotted against the wavelength.

As shown in FIG. 24, for the axial chief ray with the wavelength of 520 nm, the diffraction efficiency of substantially 100% is obtained in the vicinity of the incident angle of 21.6°. Also, as shown in FIG. 25, the reflecting diffraction efficiency is good within the wavelength range of 520 nm±10 nm. The design is made so that the axial chief ray is again incident on the volume hologram surface, orthogonally, or at the incident angle of 0° this time, after being reflected therefrom by diffraction and re-entering the first prism via the second prism. As shown in FIG. 24, for the axial chief ray with the wavelength of 520 nm incident at 0°, the diffraction efficiency on the volume hologram surface region, which presents the above-described relationship between the incident angle and the diffraction angle, is low. Therefore, the axial chief ray passes through the surface.

In the following descriptions of the embodiments, the incident angles of 21.6° and 0° at the volume hologram are referred to as a first incident angle and a second incident angle at the volume hologram, respectively.

In each embodiment, the first prism and the second prism are decentered in Y-Z plane in the XYZ Cartesian coordinate system defined above. Also, each rotationally asymmetric surface provided for the first prism and the second prism has the only plane of symmetry on Y-Z plane.

Foe each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma$) of the center axis(=Z axis in Equation (7) for free curved surface) of the surface in reference to X axis, Y axis and Z axis, respectively, are given. A positive value of $\alpha$ or $\beta$ means counterclockwise rotation in reference to the positive direction of the corresponding axis, while a positive value of $\gamma$ means clockwise rotation in reference to the positive direction of Z axis. Other parameters such as radius of curvature of spherical surface, surface separation, refractive index of medium, and Abbe's number are given by the conventional method.

As discussed above, the configuration of the free curved surface used in the present invention is defined by Equation (7), where Z axis is the axis of the free curved surface.

The free curved surface can be defined by Zernike polynomial, also. The configuration of the surface is defined by the following equations (15). Z axis appearing in Equation (15) represents the axis of Zernike polynomial. The rotationally asymmetric surface is defined by height in Z axis, in terms of polar coordinate, in reference to X-Y plane.

$$X = R \times \cos(A) \quad (15)$$
$$Y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A) \ldots$$

where R is a distance from Z axis in X-Y plane, A is an azimuth about Z axis expressed by a rotation angle from Y axis, and $D_m$ (m is integer equal to or greater than 2) is a coefficient. Note that Equation (15) corresponds to a free curved surface that is symmetric in X direction.

Configuration of a rotationally symmetric aspherical surface is defined by the following equation (16). Z axis appearing in Equation (16) represents the axis of the rotationally symmetric aspherical surface.

$$Z=(Y^2/R)/[1+\{1-P(Y^2/R^2)\}^{1/2}]+A_4 Y^4+A_6 Y^6+A_8 Y^8+A_{10}Y^{101} \ldots \quad (16)$$

where Y is a direction perpendicular to Z, R is a radius of paraxial curvature, P is a conical coefficient, and $A_4$, $A_6$, $A_8$, $A_{10}$ are aspherical coefficients.

Configuration of the free curve surface used in the embodiments of the present invention is expressed by means of Equation (7). However, even if Equation (15) is applied, it does not affect the function and effect of the invention, as a matter of course.

Figure 20:
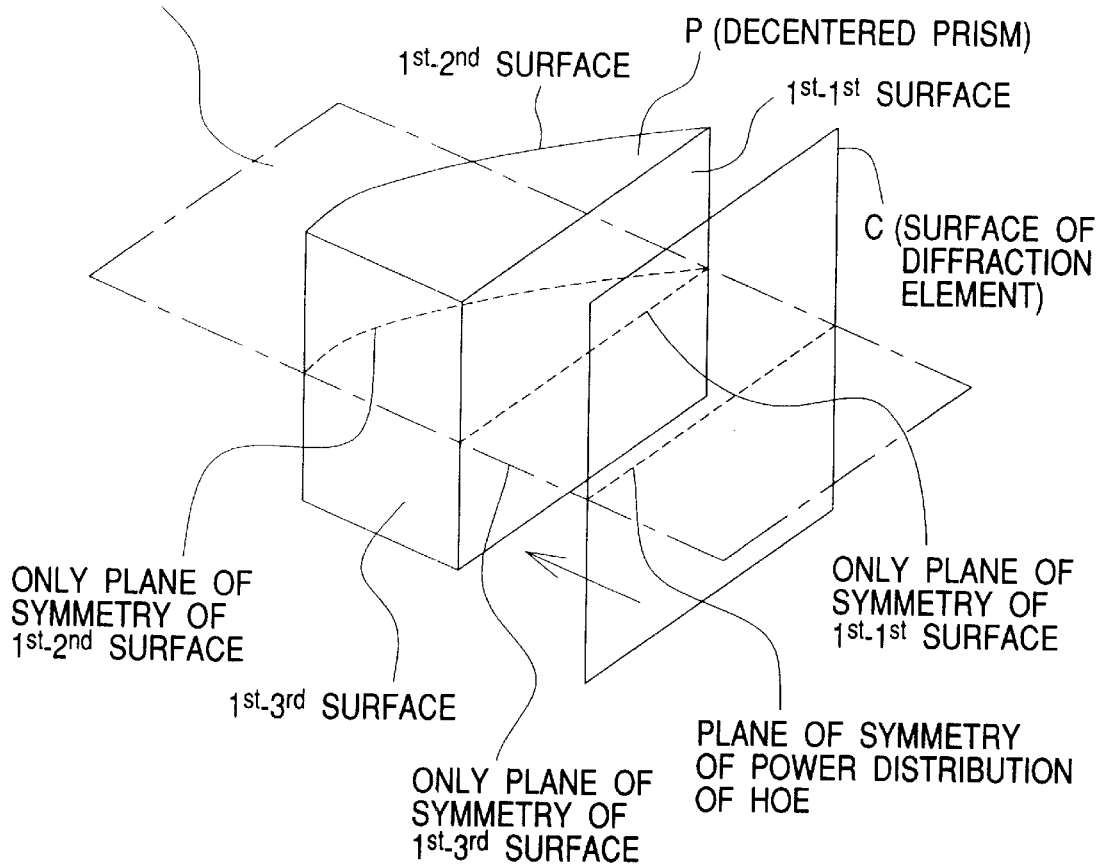
FIG. 20 shows a preferred configuration in the case where a holographic optical element (HOE) is applied to a prism included in the optical system according to the present invention.

Next, in reference to FIG. 20, description will be made of a desirable arrangement in combining a diffraction element such as the volume hologram into prisms that constitutes the optical system of the present invention. The decentered prism P in FIG. 20 corresponds to the first prism 3 included in the observation optical system or the photographing optical system of the present invention. Also, C represents a surface of the diffraction element 6 of the present invention as shown in FIG. 1. In the case where the surface C is shaped quadrangular as shown in FIG. 20 and the $1^{st}$-$1^{st}$ surface of the decentered prism P is shaped as a plane symmetric free curved surface, it is desirable, for beautiful image forming, to make arrangement so that the plane of symmetry D of the $1^{st}$-$1^{st}$ surface is parallel to at least one side of the quadrangular surface C of the diffraction element 6.

Furthermore, if the surface C of the diffraction element 6 forms a regular square or a rectangle with all of its interior angles being substantially 90°, it is desirable to make arrangement so that the plane of symmetry D of the plane symmetric free curved surface is parallel to two opposite sides of the surface C and that the plane of symmetry D coincides with the plane of symmetry of power distribution of the surface C. Such an arrangement facilitates assembly accuracy and thus is effective for mass production.

Furthermore, if a plurality or all of optical surfaces constituting the decentered prism P such as the $1^{st}$-$1^{st}$ surface, the $1^{st}$-$2^{nd}$ surface, and the $1^{st}$-$3^{rd}$ surface are plane symmetric free curved surfaces, it is desirable, in view of design convenience and in aberration performance also, to make arrangement so that the planes of symmetry of all of the plane symmetric surfaces are arranged on the common plane D. It is also desirable to satisfy the above-mentioned relationship between the plane of symmetry D and the surface C of the diffraction element 6.

Now, description will be made of individual embodiments. In the description, surface arrangement numbers in the optical system are assigned in order from the exit pupil 1 (or aperture stop 14) to LCD 5 (or image pickup element 13). Description of arrangement order of the surfaces in the first prism 1 and the second prism 2 also conforms to this rule. Also, the bundles of rays which travel in a path between the exit pupil 1 (or aperture stop 14) and the LCD 5 (or image pickup element 13) is called first bundles of rays.

The optical system of each of the first to third embodiments is explained as an observation optical system. A LCD of 0.47-inch type with the size of 9.6 mm×7.2 mm and with the center diopter of −1.0D is employed as the image display element. Regarding the view field angle, horizontal half angle is 12.5° and vertical half angle is 9.44°. Pupil diameter Φ is 4.0 mm.

Figure 4:
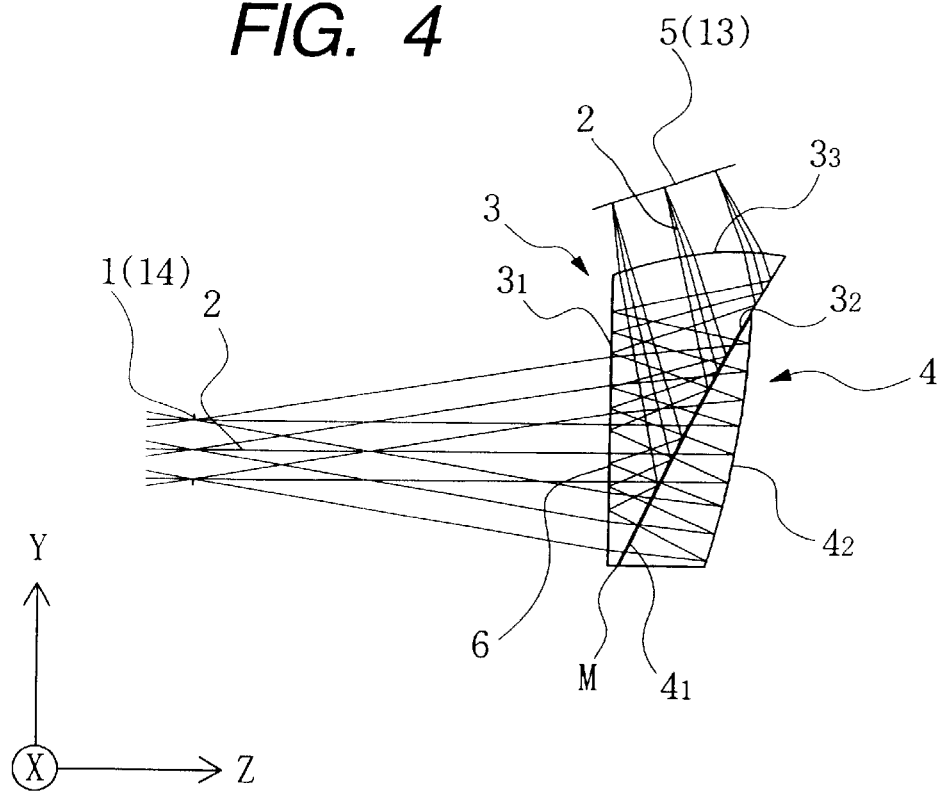
FIG. 4 is a sectional view of an optical system according to the second embodiment of the present invention taken along a Y-Z plane in which the optical axis lies.
Figure 5:
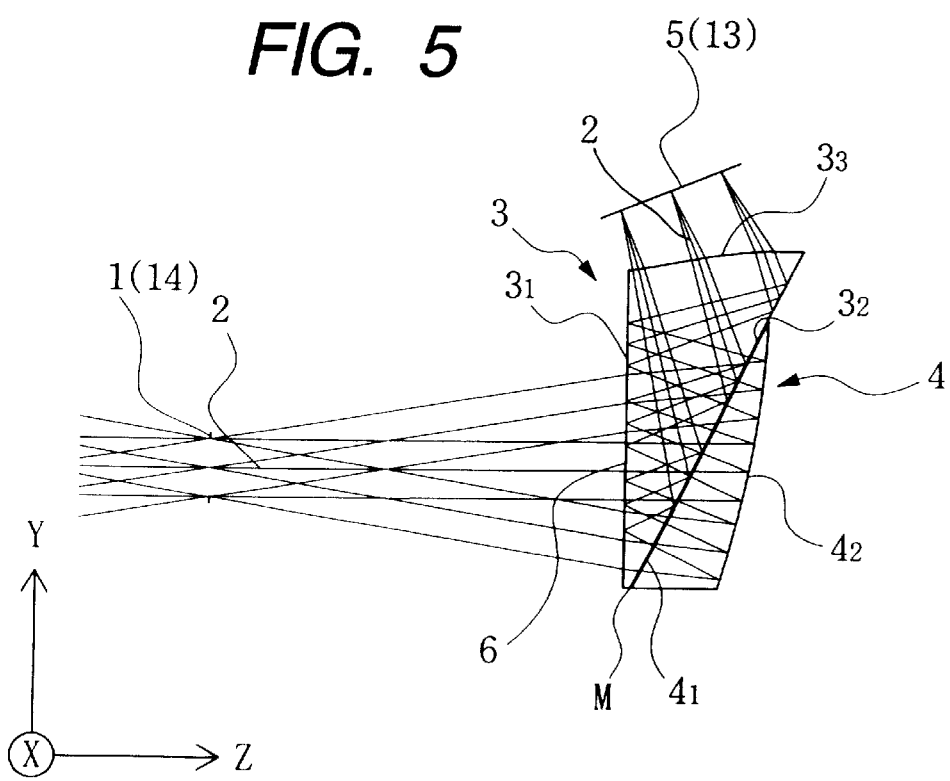
FIG. 5 is a sectional view of an optical system according to the third embodiment of the present invention taken along a Y-Z plane in which the optical axis lies.

As shown in FIGS. 1, 4 and 5, each of the optical system of the first to third embodiments is disposed between the image surface and the pupil surface. On the image surface, a LCD 5 is disposed as the image display element to display an image to be viewed by an observer. The observation optical system includes a first prism 3 and a second prism 4, and forms an exit pupil 5 on the pupil surface to allow the observer to view the image displayed on the LCD 5.

The first prism 3 has a $1^{st}$-$1^{st}$ surface $3_1$, a $1^{st}$-$2^{nd}$ surface $3_2$, and a $1^{st}$-$3^{rd}$ surface $3_3$. The $1^{st}$-$1^{st}$ surface $3_1$ is disposed on the pupil surface side and has both the actions of transmitting and reflecting the first bundle of rays. The $1^{st}$-$2^{nd}$ surface $3_2$ is disposed on the opposite side of the pupil with respect to the $1^{st}$-$1^{st}$ surface $3_1$ and is constructed and arranged so that a part of the first bundles of rays are incident thereon at incident angles greater than the critical angle and are totally reflected therefrom and that the remaining of the first bundles of rays are incident thereon at incident angles equal to or smaller than the critical angle and are transmitted therethrough, thereby to have both the actions of transmitting and reflecting the first bundles of rays. The $1^{st}$-$3^{rd}$ surface $3_3$ is disposed on the image surface side and has the action of transmitting the first bundles of rays.

The second prism 4 includes a $2^{nd}$-$1^{st}$ surface $4_1$ and a $2^{nd}$-$2^{nd}$ surface $4_2$. The $2^{nd}$-$1^{st}$ surface $4_1$ is disposed adjacent to the $1^{st}$-$2^{nd}$ surface $3_2$ at an air space M away and is constructed and arranged as an entrance and exit surface which has the action of transmitting the first bundles of rays at least twice. The $2^{nd}$-$2^{nd}$ surface $4_2$ is disposed on the opposite side of the pupil surface with respect to the $2^{nd}$-$1^{st}$ surface $4_1$ and is constructed and arranged as a reflecting surface which reflects the first bundles of rays.

A volume hologram 6 is applied to the $1^{st}$-$1^{st}$ surface $3_1$ of the first prism 3. The volume hologram 6 is constructed and arranged to transmit the first bundles of rays that are incident thereon at a first incident angle and to reflect by diffraction the first bundles of rays that are incident thereon at a second incident angle, to thereby have both of the actions of reflecting and transmitting the first bundles of rays.

In the observation optical system of each of the first to third embodiments, the first bundles of rays emergent from the LCD 5 enter the first prism 3 as being transmitted through the $1^{st}$-$3^{rd}$ surface $3_3$, are then incident on the $1^{st}$-$2^{nd}$ surface $3_2$ at an angle greater than the critical angle and reflected therefrom, are then incident on the $1^{st}$-$1^{st}$ surface $3_1$ provided with the volume hologram 6 at the first incident angle and reflected therefrom by diffraction, then exit from the first prism 3 as being incident on the $1^{st}$-$2^{nd}$ surface $3_2$ at an incident angle smaller than the critical angle and being transmitted therethrough, then, via the air space M, enter the second prism 4 as being transmitted through the $2^{nd}$-$1^{st}$ surface $4_1$, are then reflected from the $2^{nd}$-$2^{nd}$ surface $4_2$, then exit from the second prism 4 as being transmitted through the $2^{nd}$-$1^{st}$ surface $4_1$ again, then, via the air space M, re-enter the first prism 3 as being transmitted through the $1^{st}$-$2^{nd}$ surface $3_2$, and then exit from the first prism 3 as being incident on the $1^{st}$-$1^{st}$ surface $3_1$ provided with the volume hologram 6 at the second incident angle and being transmitted therethrough, to be introduced to the exit pupil 1.

Each of the first to third embodiments is explained as an observation optical system. However, if the LCD 5 on the image surface is replaced by an image pickup element 13 and an aperture stop 14 which regulates brightness of light emergent from an object is disposed on the pupil surface, the optical system can be configured as a photographing optical system.

In this case, the light from the object passing through the aperture stop 14 enters the first prism 3 as being incident on the $1^{st}$-$1^{st}$ surface $3_1$ at the second incident angle and being transmitted therethrough, once exits from the first prism 3 as being incident on the $1^{st}$-$2^{nd}$ surface $3_2$ at an incident angle smaller than the critical angle and being transmitted therethrough, then enters the second prism 4 as being transmitted through the $2^{nd}$-$1^{st}$ surface $4_1$, is then reflected from the $2^{nd}$-$2^{nd}$ surface $4_2$, then exits from the second prism 4 as being transmitted through the $2^{nd}$-$1^{st}$ surface $4_1$, then re-enters the first prism 3 as being transmitted through the $1^{st}$-$2^{nd}$ surface $3_2$, is then incident on the $1^{st}$-$1^{st}$ surface $3_1$ at the first incident angle and reflected therefrom by diffraction, is then incident on the $1^{st}$-$2^{nd}$ surface $3_2$ at an angle greater than the critical angle and totally reflected therefrom, and then exits from the first prism 3 as being transmitted through the $1^{st}$-$3^{rd}$ surface $3_3$, to be introduced to the image pickup element 13.

Also, the volume hologram 6 is constructed of three layers for R, G, B, so that a color image can be observed.

First Embodiment

FIG. 1 is directed to the first embodiment. According to the first embodiment, the first prism 3 is constructed so that the LCD 5-side surface ($1^{st}$-$3^{rd}$ surface) $3_3$ is a free curved surface, the air gap surface ($1^{st}$-$2^{nd}$ surface) $3_2$ is a rotationally symmetric aspherical surface, and the surface ($1^{st}$-$1^{st}$ surface) $3_1$ provided with the volume hologram 6 is a plane surface. The second prism 4 is constructed so that the air gap surface ($2^{nd}$-$1^{st}$ surface) $4_1$ is a rotationally symmetric aspherical surface, and the reflecting surface ($2^{nd}$-$2^{nd}$ surface) $4_2$ is a free curved surface.

The numerical data of the first embodiment is shown below. In the data, "FFS" indicates free curved surface. In the numerical data of the second and third embodiments also, "FFS" incicates free curved surface.

Figure 2:
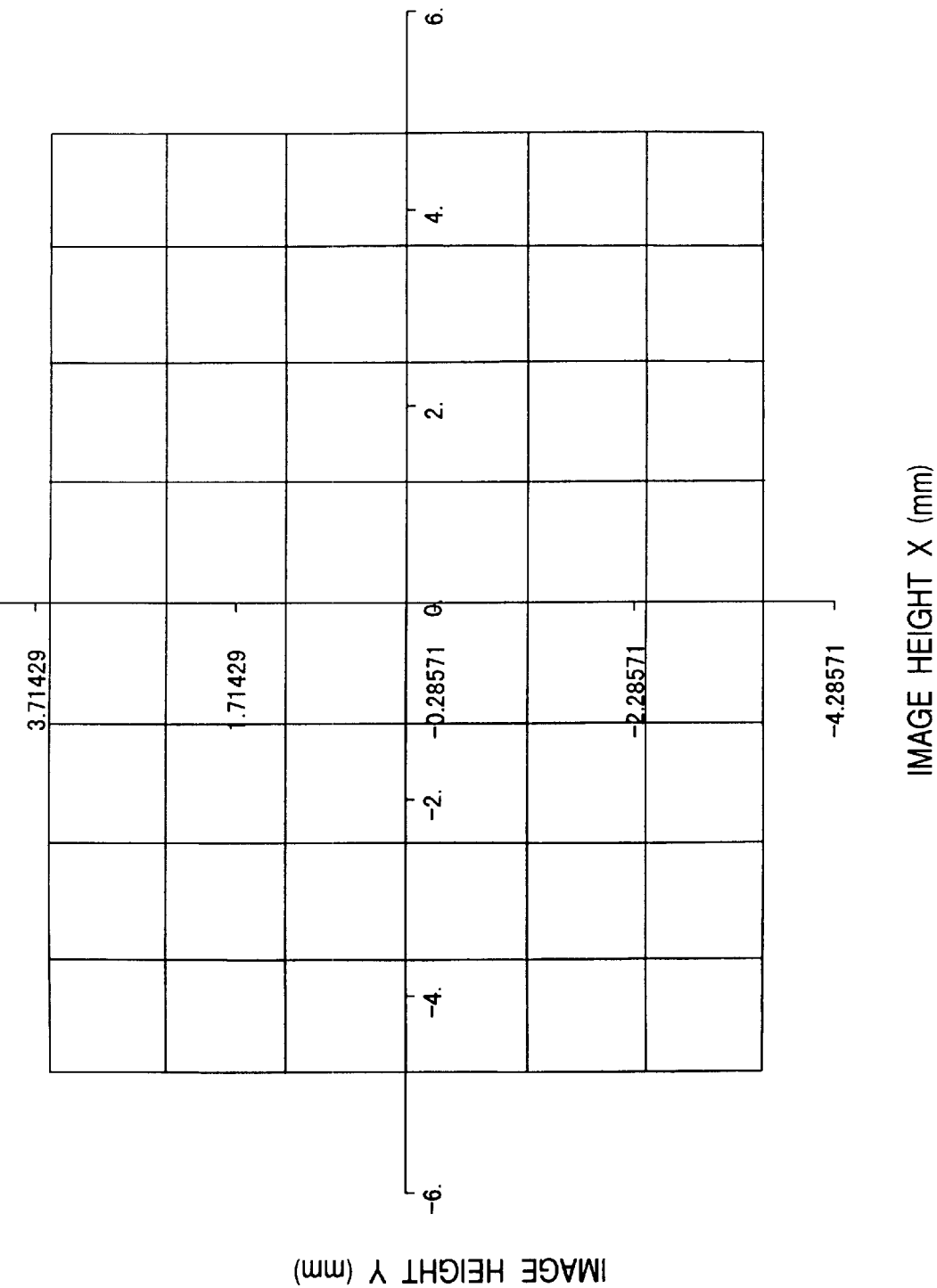
FIG. 2 is an aberration diagram showing the image distortion of the first embodiment.
Figure 3A:
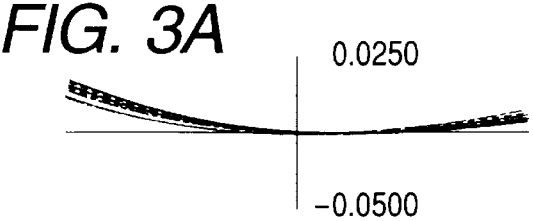
FIGS. 3A–3L are aberration diagrams showing the lateral aberrations of the first embodiment.
Figure 3B:
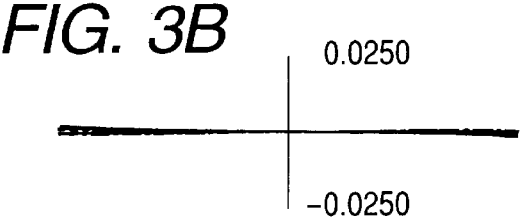
Figure 3C:
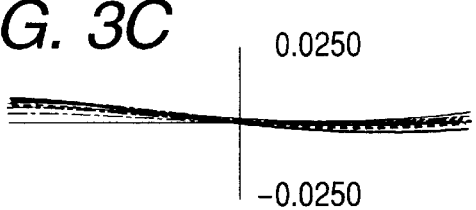
Figure 3D:
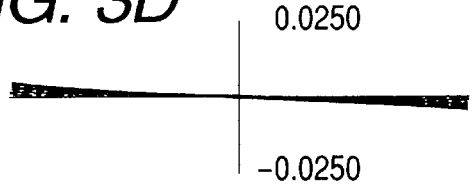
Figure 3E:
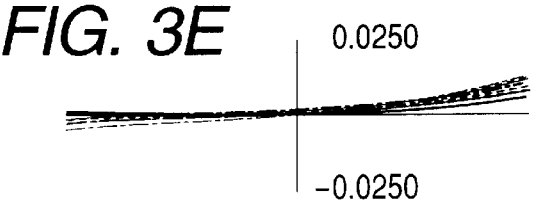
Figure 3F:
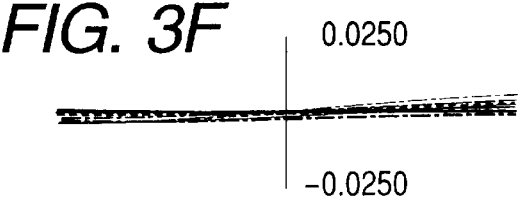
Figure 3G:
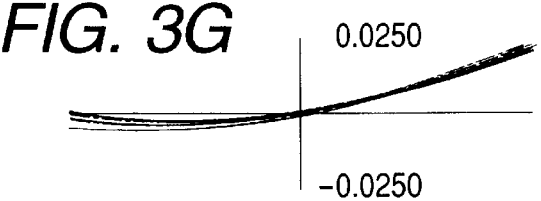
Figure 3H:
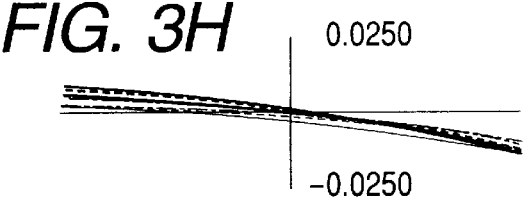
Figure 3I:
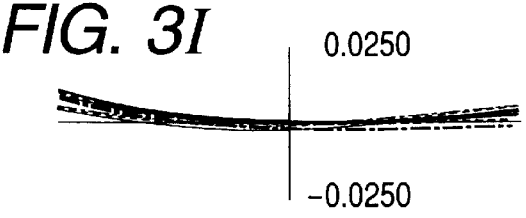
Figure 3J:
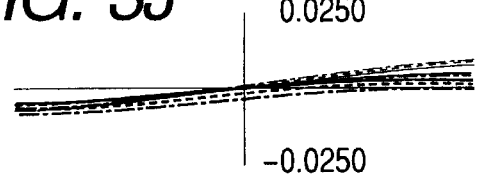
Figure 3K:
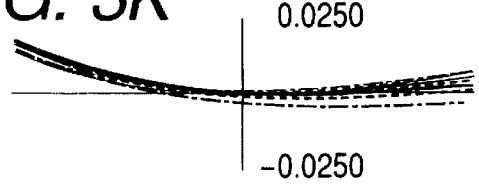
Figure 3L:
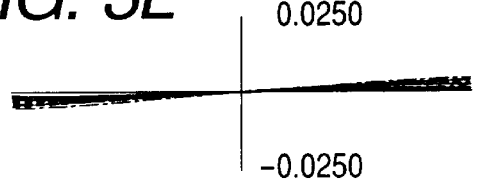

Also, image distortion of the first embodiment is shown in FIG. 2, where the ordinate represents image height in X direction, and the abscissa represents image height in Y direction. Also, lateral aberrations of the first embodiment are shown in FIGS. 3A–3L. Specifically, FIG. 3A shows lateral aberration in Y direction of a chief ray that traverses a point where field angle in X direction is zero and field angle in Y direction is zero; FIG. 3B shows lateral aberration in X direction of the chief ray that traverses the point where field angle in X direction is zero and field angle in Y direction is zero; FIG. 3C shows lateral aberration in Y direction of a chief ray that traverses a point where field angle in X direction is zero and field angle in Y negative direction is maximum; FIG. 3D shows lateral aberration in X direction of the chief ray that traverses the point where field angle in X direction is zero and field angle in Y negative direction is maximum; FIG. 3E shows lateral aberration in Y direction of a chief ray that traverses a point where field angle in X positive direction is maximum and field angle in Y negative direction is maximum; FIG. 3F shows lateral aberration in X direction of the chief ray that traverses the point where field angle in X positive direction is maximum and field angle in Y negative direction is maximum; FIG. 3G shows lateral aberration in Y direction of a chief ray that traverses a point where field angle in X positive direction is maximum and field angle in Y direction is zero; FIG. 3H shows lateral aberration in X direction of the chief ray that traverses the point where field angle in X positive direction is maximum and field angle in Y direction is zero; FIG. 3I shows lateral aberration in Y direction of a chief ray that traverses a point where field angle in X positive direction is maximum and field angle in Y positive direction is maximum; FIG. 3J shows lateral aberration in X direction of the chief ray that traverses the point where field angle in X positive direction is maximum and field angle in Y positive direction is maximum; FIG. 3K shows lateral aberration in Y direction of a chief ray that traverses a point where field angle in X direction is zero and field angle in Y positive direction is maximum; and FIG. 3L shows lateral aberration in X direction of the chief ray that traverses the point where field angle in X direction is zero and field angle in Y positive direction is maximum.

Numerical Data 1

| Surface Arrange. No. (Ref. in FIG.) | Radius of Curvature | Surface Separation | Decentering | Refractive index | Abbe's No. |
|---|---|---|---|---|---|
| object surface | ∞ | −1000.00 | | | |
| 1(1(14)) | pupil surface | | — | | |
| 2($3_1$) | ∞ | | decentering[1] | 1.5254 | 56.2 |
| 3($3_2$) | aspherical[1] | | decentering[2] | | |
| 4($4_1$) | aspherical[1] | | decentering[3] | 1.5254 | 56.2 |
| 5($4_2$) | FFS[1] | reflecting | decentering[4] | 1.5254 | 56.2 |
| 6($4_1$) | aspherical[1] | | decentering[3] | | |
| 7($3_2$) | aspherical[1] | | decentering[2] | 1.5254 | 56.2 |
| 8($3_1$) | ∞ | reflecting | decentering[1] | 1.5254 | 56.2 HOE[1] |
| 9($3_2$) | aspherical[1] | reflecting | decentering[2] | 1.5254 | 56.2 |
| 10($3_3$) | FF[2] | | decentering[5] | | |
| image surface (5(13)) | ∞ | | decentering[6] | | |

Aspherical [1]:

R = 273.65
P = 4.6258 × 10
$A_4$ = 1.1313 × $10^{-7}$   $A_6$ = −2.6746 × $10^{-9}$   $A_8$ = 2.1967 × $10^{-11}$
$A_{10}$ = −6.8725 × $10^{-14}$

FFS [1]:

$C_4$ = −7.8568 × $10^{-3}$   $C_6$ = −7.8133 × $10^{-3}$   $C_8$ = 6.8272 × $10^{-6}$
$C_{10}$ = 1.8552 × $10^{-5}$   $C_{11}$ = −1.7765 × $10^{-7}$   $C_{13}$ = −1.5001 × $10^{-6}$
$C_{15}$ = −4.8177 × $10^{-8}$

FFS [2]

$C_4$ = 2.9585 × $10^{-3}$   $C_6$ = 1.5564 × $10^{-2}$   $C_8$ = −3.2175 × $10^{-4}$
$C_{10}$ = −5.9390 × $10^{-4}$   $C_{11}$ = −4.2931 × $10^{-5}$   $C_{13}$ = −9.0218 × $10^{-5}$
$C_{15}$ = 3.7837 × $10^{-5}$

HOE [1]:

HV1 = REA          HV2 = REA          HOR = 1
HX1 = 0.0          HY1 = 0.0          HZ1 = 0.0
HX2 = 0.0          HY2 = 0.0          HZ2 = 0.0
HWL ($1^{st}$ layer) = 630    HWL ($2^{nd}$ layer) = 520    HWL ($3^{rd}$ layer) = 470
$H_2$ = 2.1010 × $10^{-3}$    $H_3$ = −4.8352 × $10^{-4}$    $H_5$ = −6.5399 × $10^{-4}$
$H_7$ = −1.3064 × $10^{-5}$   $H_9$ = 2.5612 × $10^{-5}$     $H_{10}$ = 2.2165 × $10^{-6}$
$H_{12}$ = −8.7427 × $10^{-7}$  $H_{14}$ = −9.3848 × $10^{-7}$  $H_{16}$ = −7.9749 × $10^{-8}$
$H_{18}$ = 3.7236 × $10^{-7}$   $H_{20}$ = −6.8594 × $10^{-7}$  $H_{21}$ = 9.9719 × $10^{-9}$
$H_{23}$ = 3.3075 × $10^{-8}$   $H_{25}$ = −3.0918 × $10^{-8}$  $H_{27}$ = 5.6491 × $10^{-8}$ Decentering [1]:

X = 0.00          Y = 0.00          Z = 28.00
α = 0.00          β = 0.00          γ = 0.00

Decentering [2]:

X = 0.00          Y = −0.14         Z = 32.34
α = −27.42        β = 0.00          γ = 0.00

-continued

Numerical Data 1

Decentering [3]:

| X = 0.00 | Y = −0.14 | Z = 32.44 |
|---|---|---|
| α = −27.42 | β = 0.00 | γ = 0.00 |

Decentering [4]:

| X = 0.00 | Y = −0.07 | Z = 36.74 |
|---|---|---|
| α = −9.30 | β = 0.00 | γ = 0.00 |

Decentering [5]:

| X = 0.00 | Y = 12.62 | Z = 33.22 |
|---|---|---|
| α = −81.92 | β = 0.00 | γ = 0.00 |

Decentering [6]:

| X = 0.00 | Y = 17.45 | Z = 31.91 |
|---|---|---|
| α = −72.39 | γ = 0.00 | γ = 0.00 |

Conditions:
  Condition (1), (2), (3): M=0.100 mm
  Condition (4), (5), (6): |θ|=72.38°

Second Embodiment

FIG. 4 is directed to the second embodiment. According to the second embodiment, the first prism 3 is constructed so that the LCD 5-side surface ($1^{st}$-$3^{rd}$ surface) $3_3$ is a free curved surface, the air gap surface ($1^{st}$-$2^{nd}$ surface) $3_2$ is a free curved surface, and the surface ($1^{st}$-$1^{st}$ surface) $3_1$ provided with the volume hologram 6 is a plane surface. The second prism 4 is constructed so that the air gap surface ($2^{nd}$-$1^{st}$ surface) $4_1$ is a free curved surface, and the reflecting surface ($2^{nd}$-$2^{nd}$ surface) $4_2$ is an aspherical surface.

The numerical data of the second embodiment is shown below.

Numerical Data 2

| Surface Arrange. No. (Ref. in FIG.) | Radius of Curvature | Surface Separation | Decentering | Refractive index | Abbe's No. |
|---|---|---|---|---|---|
| object surface | ∞ | −1000.00 | | | |
| 1(14)) | pupil surface | — | | | |
| 2($3_1$) | ∞ | — | decentering[1] | 1.5254 | 56.2 |
| 3($3_2$) | FFS[1] | — | decentering[2] | | |
| 4($4_1$) | FFS[1] | — | decentering[3] | 1.5254 | 56.2 |
| 5($4_2$) | aspherical[1] reflecting | — | decentering[4] | 1.5254 | 56.2 |
| 6($4_1$) | FFS[1] | — | decentering[3] | | |
| 7($3_2$) | FFS[1] | — | decentering[2] | 1.5254 | 56.2 |
| 8($3_2$) | ∞ reflecting | — | decentering[1] | 1.5254 | 56.2 HOE[1] |
| 9($3_2$) | FFS[1] reflecting | — | decentering[2] | 1.5254 | 56.2 |
| 10($3_3$) | FFS[2] | — | decentering[5] | | |
| image surface (5(13)) | ∞ | — | decentering[6] | | |

Aspherical [1]:

| R = | −63.60 | | | | |
|---|---|---|---|---|---|
| P = | 1.7865 × 10 | | | | |
| $A_4$ = | 8.6724 × $10^{-7}$ | $A_6$ = | −2.1646 × $10^{-9}$ | $A_8$ = | −3.1627 × $10^{-12}$ |
| $A_{10}$ = | 4.7340 × $10^{-4}$ | | | | |

FFS [1]:

| $C_4$ = | 1.6961 × $10^{-3}$ | $C_6$ = | 9.1600 × $10^{-4}$ | $C_8$ = | 7.8936 × $10^{-5}$ |
|---|---|---|---|---|---|
| $C_{10}$ = | 3.2840 × $10^{-5}$ | $C_{11}$ = | −2.4584 × $10^{-6}$ | $C_{11}$ = | −3.0823 × $10^{-6}$ |
| $C_{15}$ = | 2.3657 × $10^{-6}$ | | | | |

FFS [2]:

| $C_4$ = | 6.8107 × $10^{-3}$ | $C_6$ = | 2.3980 × $10^{-2}$ | $C_8$ = | −2.0312 × $10^{-4}$ |
|---|---|---|---|---|---|
| $C_{10}$ = | 6.2890 × $10^{-4}$ | $C_{11}$ = | 8.9931 × $10^{-6}$ | $C_{13}$ = | −1.2688 = × $10^{-4}$ |
| $C_{15}$ = | −2.8284 × $10^{-5}$ | | | | |

HOE [1]:

| HV1 = REA | HV2 = REA | HOR = 1 |
|---|---|---|
| HX1 = 0.0 | HY1 = 0.0 | HZ1 = 0.0 |
| HX2 = 0.0 | HY2 = 0.0 | HZ2 = 0.0 |
| HWL = ($1^{st}$ layer) = 630 | HWL = ($2^{nd}$ layer) = 520 | HWL = ($3^{rd}$ layer) = 470 |
| $H_3$ = 3.1972 × $10^{-3}$ | $H_3$ = −6.2465 × $10^{-4}$ | $H_5$ = −6.1088 × $10^{-4}$ |
| $H_7$ = 1.6859 × $10^{-5}$ | $H_9$ = −4.4746 × $10^{-5}$ | $H_{10}$ = −8.2618 × $10^{-7}$ |

-continued

Numerical Data 2

$H_{12} = 2.2305 \times 10^{-6}$  $H_{14} = 2.6225 \times 10^{-6}$  $H^{16} = -4.3232 \times 10^{-7}$
$H_{18} = 2.0006 \times 10^{-7}$  $H_{20} = -3.3007 \times 10^{-7}$  $H_{21} = 9.9719 \times 10^{-9}$
$H_{23} = 3.7228 \times 10^{-8}$  $H_{25} = -6.3363 \times 10^{-8}$  $H_{27} = 5.6491 \times 10^{-8}$ Decentering [1]:

$X = 0.00$  $Y = 0.00$  $Z = 28.00$
$\alpha = 0.00$  $\beta = 0.00$  $\gamma = 0.00$ Decentering [2]:

$X = 0.00$  $Y = -0.99$  $Z = 31.81$
$\alpha = -25.82$  $\beta = 0.00$  $\gamma = 0.00$ Decentering [3]:

$X = 0.00$  $Y = -0.99$  $Z = 31.91$
$\alpha = -25.82$  $\beta = 0.00$  $\gamma = 0.00$ Decentering [4]:

$X = 0.00$  $Y = -0.41$  $Z = 36.24$
$\alpha = -10.44$  $\beta = 0.00$  $\gamma = 0.00$ Decentering [5]:

$X = 0.00$  $Y = 13.63$  $Z = 33.19$
$\alpha = -80.61$  $\beta = 0.00$  $\gamma = 0.00$ Decentering [6]:

$X = 0.00$  $Y = 18.26$  $Z = 31.29$
$\alpha = -71.34$  $\beta = 0.00$  $\gamma = 0.00$ Conditions:
  Condition (1), (2), (3): M=0.100 mm
  Condition (4), (5), (6): $|\theta|$=71.34°

Third Embodiment

FIG. 5 is directed to the third embodiment. According to the third embodiment, the first prism 3 is constructed so that the LCD 5-side surface ($1^{st}$-$3^{rd}$ surface) $3_3$ is a free curved surface, the air gap surface ($1^{st}$-$2^{nd}$ surface) $3_2$ is a free curved surface, and the surface ($1^{st}$-$1^{st}$ surface) $3_1$ provided with the volume hologram 6 is a plane surface. The second prism 4 is constructed so that the air gap surface ($2^{nd}$-$1^{st}$ surface) $4_1$ is a free curved surface, and the reflecting surface ($2^{nd}$-$2^{nd}$ surface) $4_2$ is a free curved surface.

The numerical data of the third embodiment is shown below.

Numerical Data 3

| Surface Arrange. No. (Ref. in FIG.) | Radius of Curvature | Surface Separation | Decentering | Refractive index | Abbe's No. | |
|---|---|---|---|---|---|---|
| object surface | ∞ | −1000.00 | | | | |
| 1(1(14)) | pupil surface | — | | | | |
| 2($3_1$) | ∞ | — | decentering[1] | 1.5254 | 56.2 | |
| 3($3_2$) | FFS[1] | — | decentering[2] | | | |
| 4($4_1$) | FFS[1] | — | decentering[3] | 1.5254 | 56.2 | |
| 5($4_2$) | FFS[2] | reflecting | decentering[4] | 1.5254 | 56.2 | |
| 6($4_1$) | FFS[1] | — | decentering[3] | | | |
| 7($3_2$) | FFS[1] | — | decentering[2] | 1.5254 | 56.2 | |
| 8($3_1$) | ∞ | reflecting | decentering[1] | 1.5254 | 56.2 | HOE[1] |
| 9($3_2$) | FFS[1] | reflecting | decentering[2] | | | |
| 10($3_3$) | FFS[3] | — | decentering[5] | | | |
| image surface (5(13)) | ∞ | — | decentering[6] | | | |

FFS [1]:

$C_4 = 1.7478 \times 10^{-3}$  $C_6 = -1.5031 \times 10^{-3}$  $C_8 = 3.7454 \times 10^{-5}$
$C_{10} = 7.2576 \times 10^{-5}$  $C_{11} = -3.7493 \times 10^{-6}$  $C_{13} = 1.8489 \times 10^{-6}$
$C_{15} = 1.2786 \times 10^{-6}$

FFS [2]:

$C_4 = -7.6275 \times 10^{-3}$  $C_6 = -7.1324 \times 10^{-3}$  $C_8 = 6.9618 \times 10^{-6}$
$C_{10} = -2.5629 \times 10^{-5}$  $C_{11} = 5.5490 \times 10^{-7}$  $C_{13} = -3.9371 \times 10^{-7}$
$C_{15} = 2.1700 \times 10^{-6}$ -continued Numerical Data 3

FFS [3]:

| | | | | | |
|---|---|---|---|---|---|
| $C_4 =$ | $1.1455 \times 10^{-2}$ | $C_6 =$ | $8.1317 \times 10^{-3}$ | $C_8 =$ | $9.1859 \times 10^{-6}$ |
| $C_{10} =$ | $1.3543 \times 10^{-3}$ | $C_{11} =$ | $1.4223 \times 10^{-5}$ | $C_{13} =$ | $-6.4580 \times 10^{-5}$ |
| $C_{15} =$ | $5.8090 \times 10^{-5}$ | | | | |

HOE [1]:

| | | |
|---|---|---|
| HV1 = REA | HV2 = REA | HOR = 1 |
| HX1 = 0.0 | HY1 = 0.0 | HZ1 = 0.0 |
| HX2 = 0.0 | HY2 = 0.8 | HZ2 = 0.0 |
| HWL = (1$^{st}$ layer) = 630 | HWL = (2$^{nd}$ = layer) = 520 | HWL = (3$^{rd}$ layer) = 470 |
| $H_2 = 1.8624 \times 10^{-7}$ | $H_3 = -5.7918 \times 10^{-4}$ | $H_5 = -4.5646 \times 10^{-4}$ |
| $H_7 = -5.4305 \times 10^{-6}$ | $H_9 = -2.3629 \times 10^{-5}$ | $H_{10} = -1.1696 \times 10^{-6}$ |
| $H_{12} = -9.5246 \times 10^{-7}$ | $H_{14} = 4.0339 \times 10^{-6}$ | $H_{16} = -1.7488 \times 10^{-7}$ |
| $H_{18} = 3.1789 \times 10^{-7}$ | $H_{20} = -4.2790 \times 10^{-7}$ | $H_{21} = 9.2848 \times 10^{-9}$ |
| $H_{23} = 1.6458 \times 10^{-8}$ | $H_{25} = -2.3055 \times 10^{-8}$ | $H_{27} = 1.3589 \times 10^{-8}$ |

Decentering [1]:

| | | |
|---|---|---|
| X = 0.00 | Y = 0.00 | Z = 28.00 |
| α = 0.00 | β = 0.00 | Y = 0.00 |

Decentering [2]:

| | | |
|---|---|---|
| X = 0.00 | Y = 0.00 | Z = 32.43 |
| α = −25.68 | β = 0.00 | Y = 0.00 |

Decentering [3]:

| | | |
|---|---|---|
| X = 0.00 | Y = 0.00 | Z = 32.53 |
| α = −25.68 | β = 0.00 | Y = 0.00 |

Decentering [4]:

| | | |
|---|---|---|
| X = 0.00 | Y = 0.02 | Z = 36.22 |
| α = −10.84 | β = 0.00 | γ = 0.00 |

Decentering [5]:

| | | |
|---|---|---|
| X = 0.00 | Y = 14.59 | Z = 32.77 |
| α = −80.06 | β = 0.00 | Z = 0.00 |

Decentering [6]:

| | | |
|---|---|---|
| X = 0.00 | Y = 19.16 | Z = 30.75 |
| α = −67.66 | β = 0.00 | Y = 0.00 |

Conditions:
 Condition (1), (2), (3): M=0.100 mm
 Condition (4), (5), (6): |θ|=67.656°

Fourth Embodiment

Figure 6:
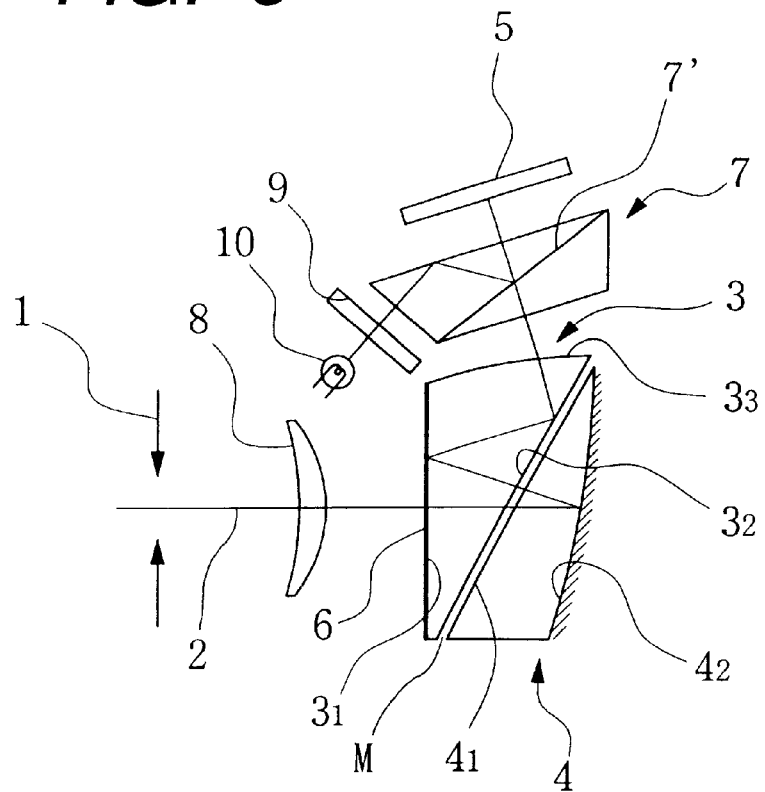
FIG. 6 is a sectional view of an optical system according to the fourth embodiment of the present invention taken along a Y-Z plane in which the optical axis lies.

In reference to FIG. 6, description is made of the optical system of the fourth embodiment according to the present invention. The optical system of the fourth embodiment is configured to include, in addition to the optical system of basic configuration according to the first to third embodiments, optical members such as a polarization beam splitter 7 and a positive lens 8.

The polarization beam splitter 7 is disposed between the 1$^{st}$-3$^{rd}$ surface $3_3$ of the first prism 3 and the LCD 5. On a lateral side of the beam splitter 7, a polarizing plate 9 and a light source (LCD) 10 for illumination are disposed.

Illumination light emanating from the LCD 10 is converted into light of linearly polarized components via the polarizing plate 9 and enters the beam splitter 7. Of the linearly polarized components, a predetermined polarized component is reflected from a polarization surface 7' of the beams splitter 7, emerges from the LCD 5-side surface, and illuminates the LCD 5. After that, the linearly polarized component changes its polarization condition as it is reflected from the LCD 5, enters the polarization beam splitter 7, is transmitted through the polarization surface 7', and emerges from the beam splitter 7, to be incident on the 1$^{st}$-3$^{rd}$ surface $3_3$ of the first prism 3.

According to the fourth embodiment, the first prism 3 is constructed so that the LCD 5-side surface (1$^{st}$-3$^{rd}$ surface) $3_3$ is a free curved surface, the air gap surface (1$^{st}$-2$^{nd}$ surface) $3_2$ is a plane surface, and the surface (1$^{st}$-1$^{st}$ surface) $3_1$ provided with the volume hologram 6 is a plane surface. The second prism 4 is constructed so that the air gap surface (2$^{nd}$-1$^{st}$ surface) $4_1$ is a plane surface, and the reflecting surface (2$^{nd}$-2$^{nd}$ surface) $4_2$ is a free curved surface. A mirror coating is applied to the reflecting surface (2$^{nd}$-2$^{nd}$ surface) $4_2$.

The positive lens 8 is disposed between the 1$^{st}$-1$^{st}$ surface $3_1$ of the first prism 3 and the exit pupil 1, so as to image the light emergent from the 1$^{st}$-1$^{st}$ surface $3_1$ on the exit pupil 1 while compensating aberrations.

Fifth Embodiment

Figure 7:
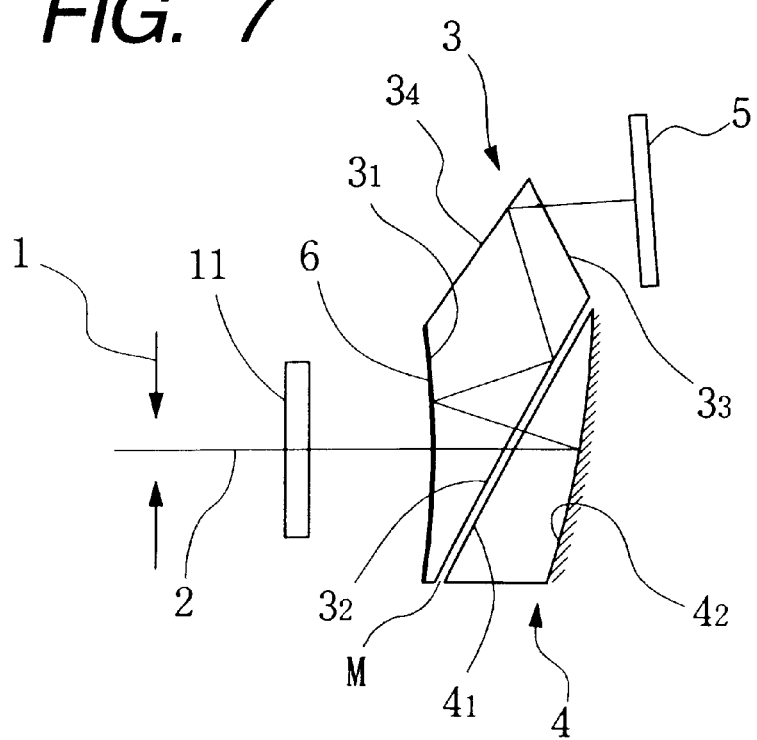
FIG. 7 is a sectional view of an optical system according to the fifth embodiment of the present invention taken along a Y-Z plane in which the optical axis lies.

In reference to FIG. 7, description is made of the optical system of the fifth embodiment according to the present invention. According to the fifth embodiment, the first prism 3 further includes a surface $3_4$, which reflects the first bundles of rays in the path between the 1$^{st}$-3$^{rd}$ surface $3_3$ and the 1$^{st}$-2$^{nd}$ surface $3_2$ inside the prism. Also, a cover member 11 such as a plane parallel plate made of glass is disposed between the 1$^{st}$-1$^{st}$ surface $3_1$ of the first prism 3 and the exit pupil 1.

According to the fifth embodiment, the first prism 3 is constructed so that the LCD 5-side surface (1$^{st}$-3$^{rd}$ surface) $3_3$ is a free curved surface, the air gap surface (1$^{st}$-2$^{nd}$ surface) $3_2$ is a rotationally symmetric aspherical surface, the surface (1$^{st}$-1$^{st}$ surface) $3_1$ provided with the volume hologram 6 is a spherical surface, and the surface $3_4$ which reflects the first bundles of rays in the path between the $1^{st}$-$3^{rd}$ surface $3_3$ and the $1^{st}$-$2^{nd}$ surface $3_2$ is a free curved surface. The second prism 4 is constructed so that the air gap surface ($2^{nd}$-$1^{st}$ surface) $4_1$ is a rotationally symmetric aspherical surface, and the reflecting surface ($2^{nd}$-$2^{nd}$ surface) $4_2$ is a free curved surface. A mirror coating is applied to the reflecting surface ($2^{nd}$-$2^{nd}$ surface) $4_2$.

Sixth Embodiment

Figure 8:
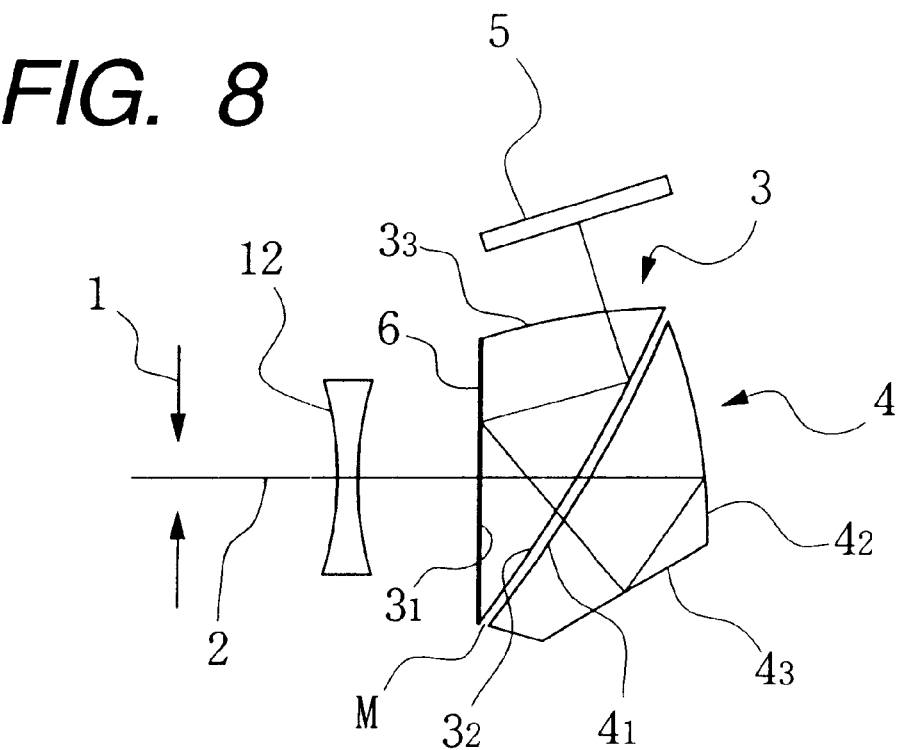
FIG. 8 is a sectional view of an optical system according to the sixth embodiment of the present invention taken along a Y-Z plane in which the optical axis lies.

In reference to FIG. 8, description is made of the optical system of the sixth embodiment according to the present invention. According to the sixth embodiment, the second prism 4 further includes a surface $4_3$, which reflects the first bundles of rays in the path between the $2^{nd}$-$2^{nd}$ surface $4_2$ and the $2^{nd}$-$1^{st}$ surface $4_1$ inside the prism. Also, a negative lens 12 is disposed between the $1^{st}$-$1^{st}$ surface $3_1$ of the first prism 3 and the exit pupil 1.

According to the sixth embodiment, the first prism 3 is constructed so that the LCD 5-side surface ($1^{st}$-$3^{rd}$ surface) $3_3$ is a free curved surface, the air gap surface ($1^{st}$-$2^{nd}$ surface) $3_2$ is a spherical surface, and the surface ($1^{st}$-$1^{st}$ surface) $3_1$ provided with the volume hologram 6 is a plane surface. The second prism 4 is constructed so that the air gap surface ($2^{nd}$-$1^{st}$ surface) $4_1$ is a spherical surface, the reflecting surface ($2^{nd}$-$2^{nd}$ surface) $4_2$ is a free curved surface, and the surface $4_3$ which reflects the first bundles of rays in the path between the $2^{nd}$-$2^{nd}$ surface $4_2$ and the $2^{nd}$-$1^{st}$ surface $4_1$ is a free curved surface.

Seventh Embodiment

Figure 9:
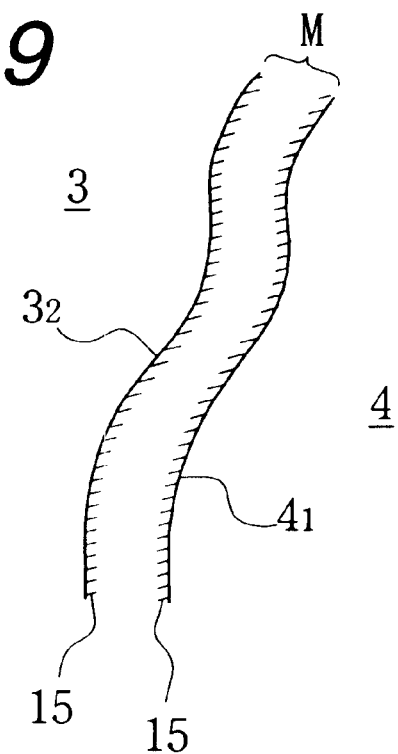
FIG. 9 is a sectional view of a part of an optical system according to the seventh embodiment of the present invention.

In reference to FIG. 9, description is made of the optical system of the seventh embodiment of the present invention. According to the seventh embodiment, in any of the optical system of first to sixth embodiments, at least one of the $1^{st}$-$2^{nd}$ d surface $3_2$ of the first prism 3 and the $2^{nd}$-$1^{st}$ surface $4_1$ of the second prism 4 is provided with an anti-reflection coating 15, to thereby prevent generation of ghost.

In each of the first to seventh embodiments, the air space M between the $1^{st}$-$2^{nd}$ surface $3_2$ of the first prism 3 and the $2^{nd}$-$1^{st}$ surface $4_1$ of the second prism 4 is set at 0.1 mm.

Eighth Embodiment

Figure 10:
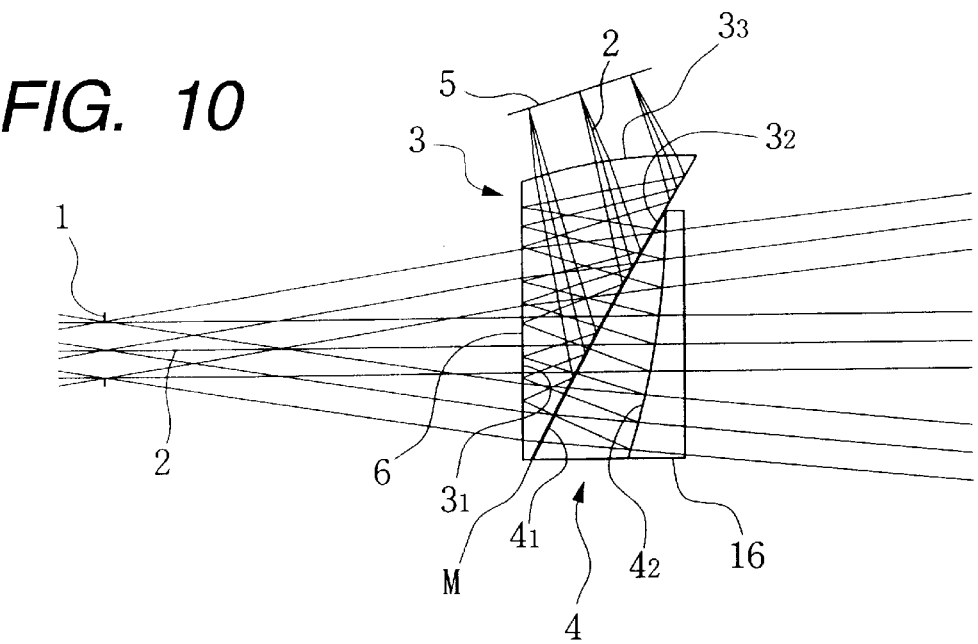
FIG. 10 is a sectional view of an optical system according to the eighth embodiment of the present invention taken along a Y-Z plane in which the optical axis lies.

In reference to FIG. 10, description is made of the optical system according to the eighth embodiment of the present invention. In the observation optical system according to the eighth embodiment, the $2^{nd}$-$2^{nd}$ surface $4_2$ of said second prism 4 is constructed and arranged such that a part of second bundles of rays are incident thereon at angles greater than a critical angle and are totally reflected therefrom and that a remaining part of the second bundles of rays are incident thereon at angles equal to or smaller than the critical angle and are transmitted therethrough. The second bundles of rays are defined to be effective bundles of rays that travel in a path between the $2^{nd}$-$1^{st}$ surface $4_1$ and an opposite side of the $2^{nd}$-$1^{st}$ surface $4_1$ with respect to the $2^{nd}$-$2^{nd}$ surface $4_2$. Also, a prism 16 is disposed on the side of the $2^{nd}$-$2^{nd}$ surface $4_2$, so that an observer can view a transmitted image of external environment, in addition to the displayed image from the LCD 5.

Ninth Embodiment

Figure 11:
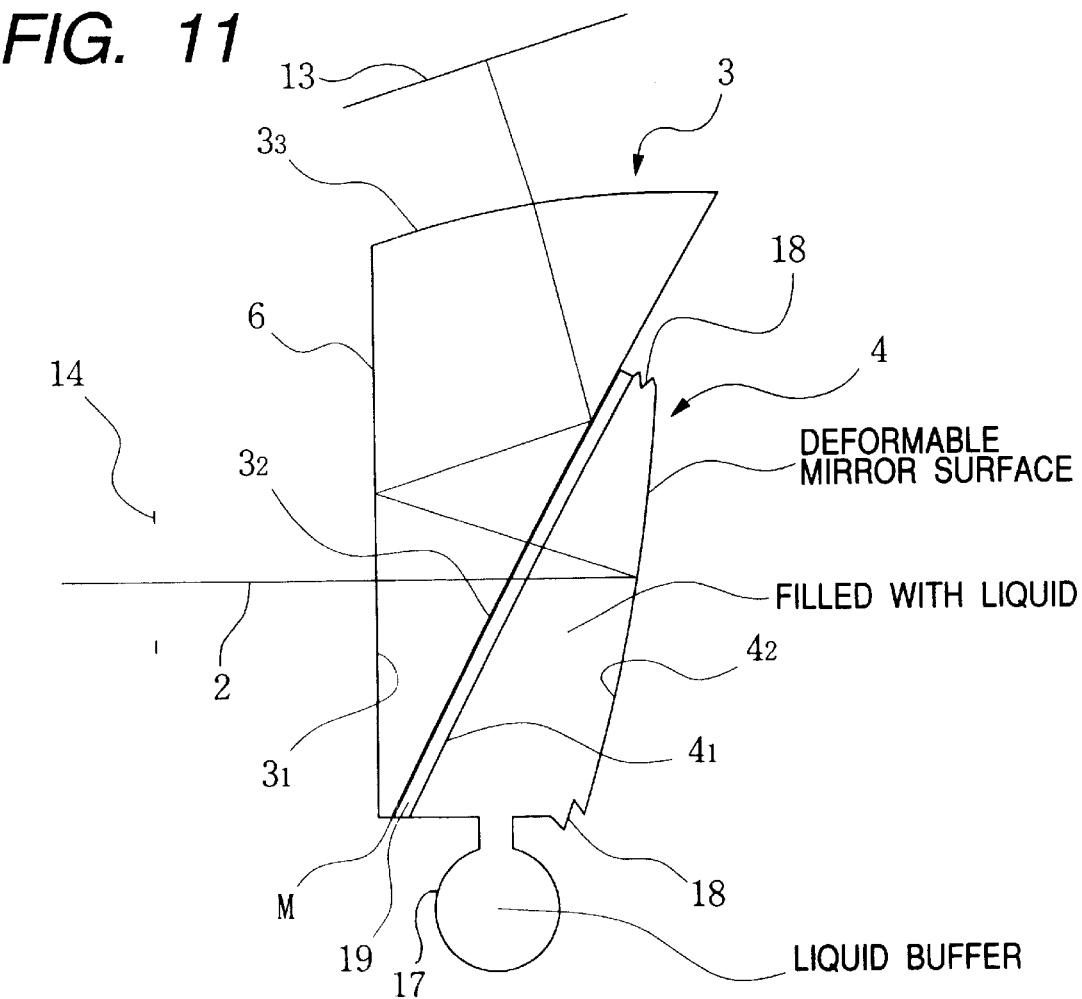
FIG. 11 is a sectional view of the essential part of a photographing optical system according to the ninth embodiment of the present invention taken along a Y-Z plane in which the optical axis lies.

In reference to FIG. 11, description is made of the optical system according to the ninth embodiment of the present invention. The photographing optical system according to the ninth embodiment is configured such that the LCD 5 and the exit pupil 1 of the observation optical system according to the first to eighth embodiment are replaced by an image pickup element 13 and an aperture stop 14, respectively. Furthermore, the medium inside the second prism 4 is liquid and the reflecting surface ($2^{nd}$-$2^{nd}$ surface) $4_2$ of the second prism 4 is formed as a deformable mirror surface (Reference Document: Gleb Vdovin, "Quick focusing of imaging optics using micromachined adaptive mirrors", Optics Communications, 140, 1997, pp.187–190).

Specifically, the second prism 4 includes a transparent shell made of plastic or the like shaped to have a hollow inside and liquid filling the hollow, and is provided with a buffer section 17 having a liquid buffer. Also, the second prism 4 is provided with a bellows section 18 which is deformable like bellows on the lateral sides of the deformable mirror surface $4_2$, so that the bellows section 18 expands or contracts in accordance with liquid pressure of the buffer inside. Also, the $2^{nd}$-$1^{st}$ surface $4_1$ of the second prism 4 is bonded to a transparent plane parallel plate 19 made of glass, plastic or the like. The air space M is provided between the $1^{st}$-$2^{nd}$ surface $3_2$ of the first prism 3 and the plane parallel plate 19, and is kept constant irrespective of change of liquid pressure inside the second prism 4.

According to the ninth embodiment, when the buffer section 17 is pressed to apply a liquid pressure to the second prism 4, the bellows section 18 expands in the direction away from the $2^{nd}$-$1^{st}$ surface $4_1$, and accordingly the position of the deformable mirror surface $4_2$ is changed. When the position of the deformable mirror surface $4_2$ is changed, the optical path length of the bundles of rays reflected therefrom and directed toward the image pickup element 13 is changed, and consequently the image position is changed.

Therefore, according to the ninth embodiment, the second prism 4 can be used as a focusing system of a photographing optical system.

The observation optical system and the photographing optical system of the present invention as described in the foregoing embodiments are applicable to an observation apparatus, which provides an observer with a view of an object image via an eyepiece, and a photographing apparatus, which performs photographing by forming an object image and making it received on an image pickup element such as a CCD and a silver halide film. These apparatuses include a microscope, a head-mount type image display apparatus, an endoscope, a projector, a silver halide film camera, a digital camera, VTR camera, etc. Application examples are described below.

Figure 12:
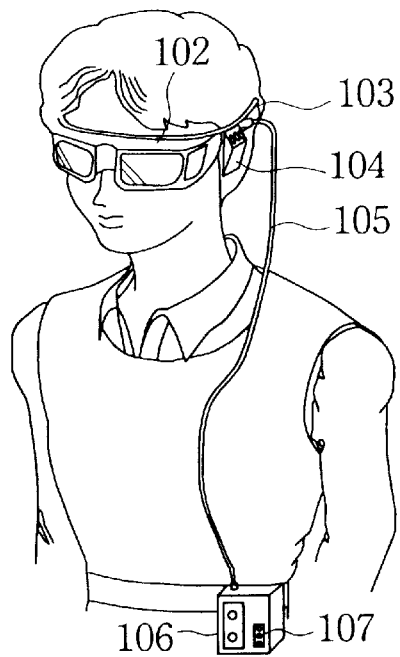
FIG. 12 is a perspective view of a head-mount type binocular image display apparatus using the observation optical system according to the present invention, as it is fit to the head of an observer.
Figure 13:
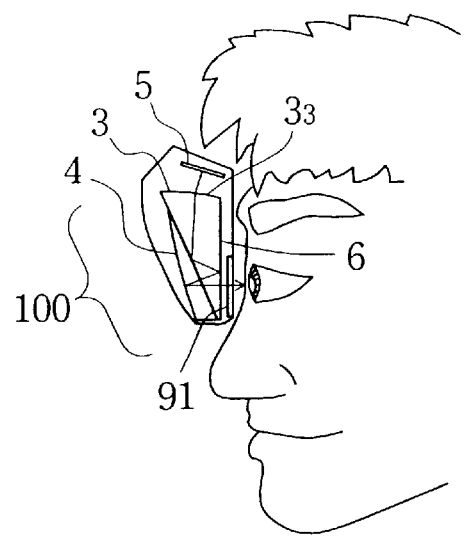
FIG. 13 is a sectional view of the apparatus shown in FIG. 12.

FIGS. 12 and 13 show a head-mount type binocular image display apparatus. This apparatus is configured to use the observation optical system according to the present invention as an eyepiece optical system 100 provided with an image display element 5. A pair of such eyepiece optical systems 100 are provided and held spaced away from each other by the interpupillary distance, to form a stationary type or portable type image display apparatus for binocular observation such as the head-mount type image display apparatus shown in the drawings.

The main frame 102 of the image display apparatus is provided with a pair of eyepiece optical systems 100, which use, as discussed above, the observation optical systems according to the present invention, and a pair of image display elements 5 constructed of liquid crystal display elements disposed on the respective image surfaces of the optical systems. As shown in FIG. 12, a pair of side-head frames 103 are coupled to the main frame 102 on the lateral sides thereof so as to hold the main frame 102 in front of the eyes of the observer. As shown in FIG. 13, a cover member 91 is disposed between the exit pupil and the $1^{st}$-$1^{st}$ surface $3_1$ of the eyepiece optical system 100 for the purpose of protecting the holographic element 6 applied to the $1^{st}$-$1^{st}$ surface $3_1$ of the first prism 3 of the eyepiece optical system 100. The cover member 91 may be any one of a plane parallel plate, a positive lens and a negative lens.

Also, each of the side-head frames 103 is equipped with a speaker 104 so that the observer can enjoy stereophony, in addition to the image. In the configuration where the speakers 104 are provided as described above, a player unit 106 for a portable video cassette or the like is connected to the main frame 102 via a video/audio transmission cord 105. The player unit 106 can be held to an arbitrary position, for example to one's waist belt position, as shown in FIG. 12. The reference numeral 107 represents a control section including a switch, a volume control etc. of the player unit 106. Electronic devices such as video processing and audio processing circuits are built in the main frame 102.

The end of the cord 105 may be formed as a jack to be plugged in an existing video deck etc. Also, the cord 105 may be connected to a TV tuner, which receives broadcasting waves, for observation of TV programs, or may be connected to a computer to receive images of computer graphics or text messages. Alternatively, the apparatus may be provided with an antenna for receiving external signals carried by radio waves, for the purpose of removing the cord, which often is obstructive.

Figure 14:
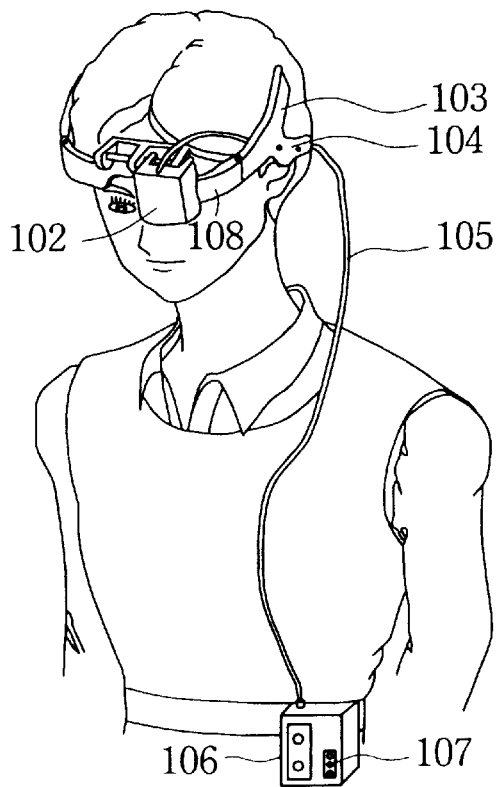
FIG. 14 is a perspective view of a head-mount type monocular image display apparatus using the observation optical system according to the present invention, as it is fit to the head of an observer.

Also, the observation optical system according to the present invention may be applied to a head-mount type monocular image display apparatus. As shown in FIG. 14, an eyepiece optical system held in the main frame 102 is disposed in front of either one of the left and right eyes (in the drawing, in front of the left eye) of the observer. In this configuration, the main frame 102 which is provided with a set of the eyepiece optical system 100 with the image display element 5 shown in FIG. 13 is mounted on a front frame 108 at a position in front of the corresponding eye. A pair of side-head frames 103 are coupled to the front frame 107 on the lateral sides thereof so as to hold the main frame 102 in front of the odd eye of the observer. Other features are similar to those of the foregoing binocular configuration shown in FIG. 12, and thus explanation about them is omitted here.

Figure 15:
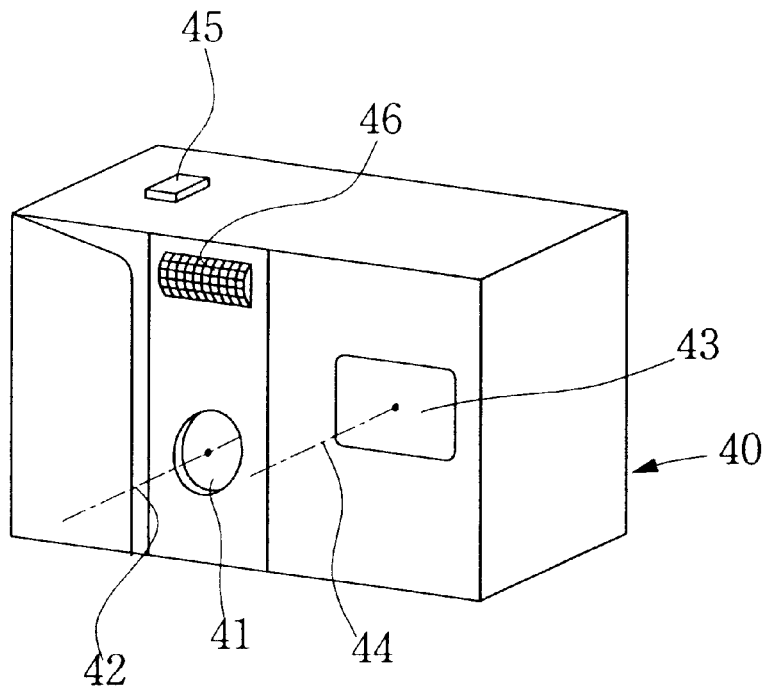
FIG. 15 is a perspective view showing the front side appearance of an electronic camera which incorporates therein the photographing optical system according to the present invention.
Figure 16:
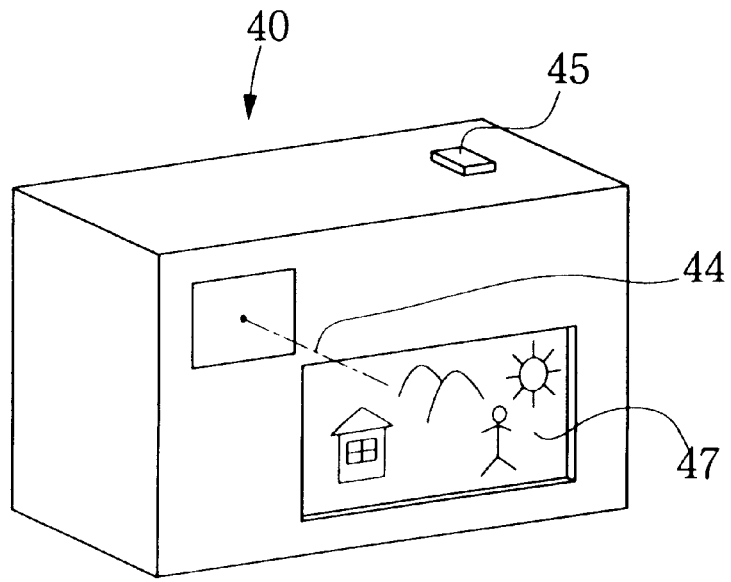
FIG. 16 is a perspective view showing the rear side appearance of the electronic camera of FIG. 15.
Figure 17:
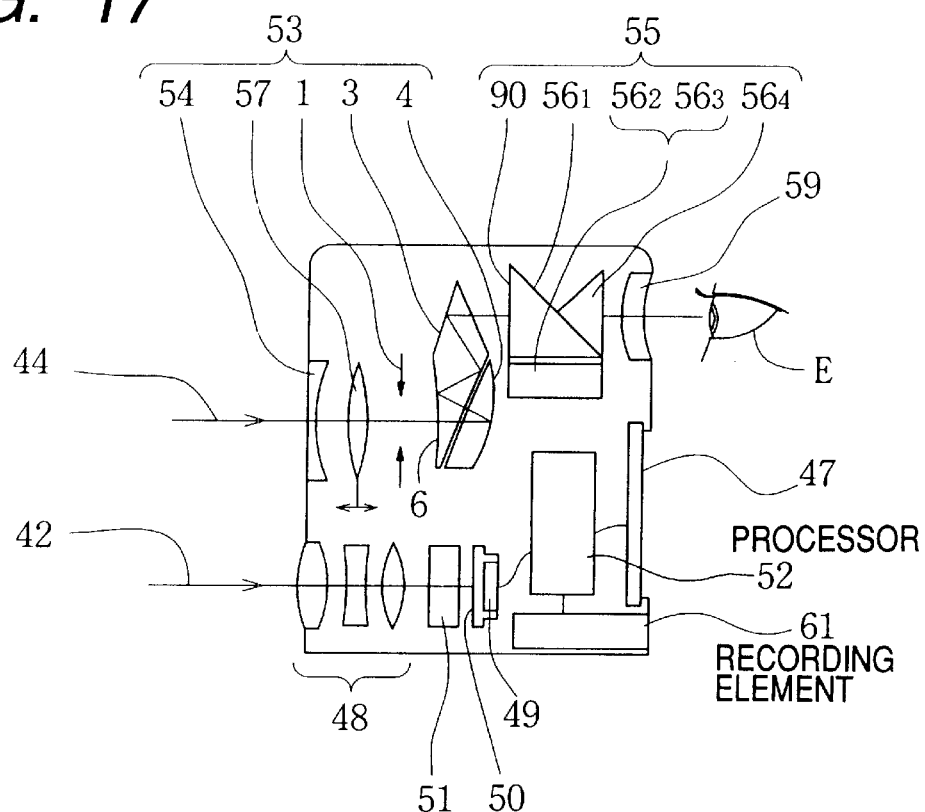
FIG. 17 is a sectional view showing one example of configuration of the electronic camera of FIG. 15.

In reference to FIGS. 15–17, description is made of an application example in which the photographing optical system according to the present invention is used in a finder objective optical system of an electronic camera. An electronic camera 40 includes a photographing optical system 41 which defines a photographing path 42, a finder optical system 43 which defines a finder path 44, a shutter button 45, a flash 46, and a liquid crystal display monitor 47. When a user pushes the shutter button 45 arranged on the top face of the camera 40, photographing is performed accordingly via a photographing objective optical system 48 in the photographing optical system 41. An object image by the photographing optical system 48 is formed on an image pickup surface 50 of a CCD 49 via a filter 51 such as a low-pass filter and an infrared cut filter.

The object image received by the CCD 49 is displayed, via a processor 52, on the liquid crystal display monitor 47, which is provided on the back face of the camera 40, as an electronic image. The processor 52 is provided with a recording element 61 and thus the electronic image as photographed can be recorded. The recording element 61 may be provided separate from the processor 52 or may be configured to perform electronic writing on a floppy disk etc. Also, the camera may be configured as a silver halide camera, which is provided with a silver halide film instead of the CCD 49.

Furthermore, on the finder path 44, a finder objective optical system 53 is provided. The finder objective optical system 53 includes a cover lens 54, a positive lens unit 57 whose position is adjustable in axial directions for focusing, and the aperture stop 1, the first prism 3 and the second prism 4 which are described in the embodiment of FIG. 7. The cover lens 54 used as a cover member is a lens unit, which has a negative refracting power to widen the field angle. The object image formed by the finder objective optical system 53 on an image surface 90 is formed on a field frame in a porro prism system 55, which is an image erecting member.

The field frame is disposed between a first reflecting surface $56_1$ and a second reflecting surface $56_2$ of the porro prism system 55. The porro prism system includes the first reflecting surface $56_1$ to a fourth reflecting surface $56_4$. An eyepiece optical system 59 is disposed behind the porro prism system 55 to introduce a correctly erected image to an eye E of the observer.

The camera 40 having the above-described configuration is advantageous in that the finder objective optical system 53 can be constructed of a small number of optical members and thus facilitates high performance and cost reduction. Also, since the path of the objective optical system 53 is folded, the arrangement inside the camera can be more freely designed.

Regarding the configuration of FIG. 17, the configuration of the photographing objective optical system 48 is not referred to here. However, not limited to the refractive coaxial optical system shown in the drawing, any type of the photographing optical system of the present invention constructed of two prisms 3 and 4 can be used as the photographing objective optical system 48, as a matter of course.

Figure 18:
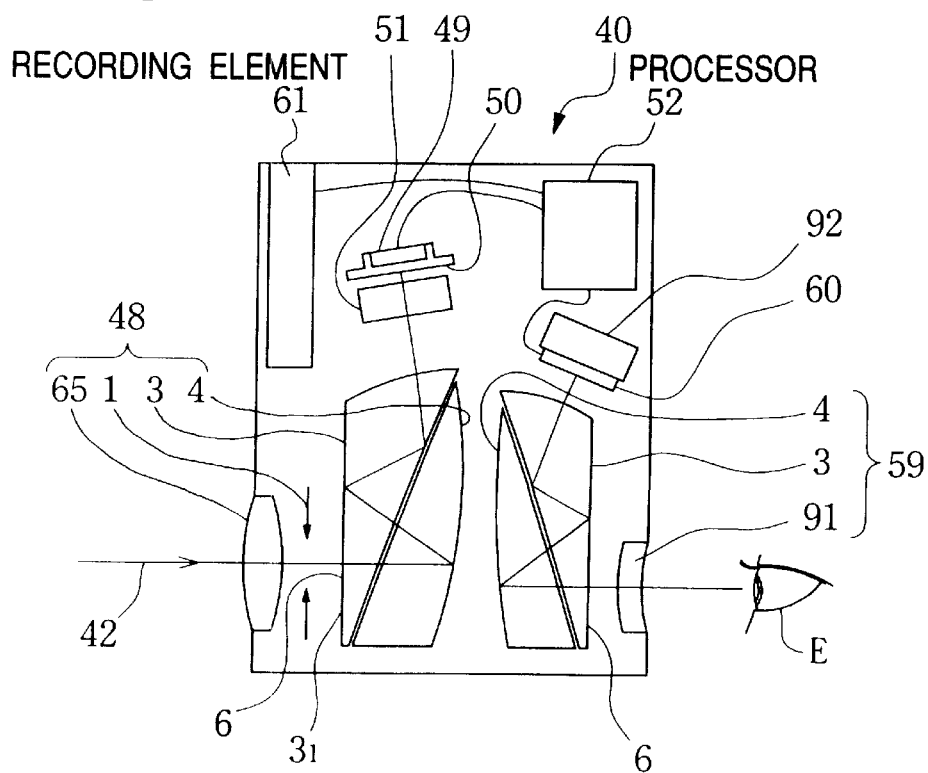
FIG. 18 is a schematic view showing the configuration of another electronic camera incorporating therein the photographing optical system and the observation optical system according to the present invention.

FIG. 18 shows another electronic camera 40 in which the photographing optical system of the present invention is incorporated into the photographing objective optical system 48 and the observation optical system of the present invention is incorporated into the eyepiece optical system 59. In this configuration, the photographing objective optical system 48 disposed on the photographing path 42 includes a cover member 65 constructed of a positive lens, and any type of photographing optical system with two prisms 3, 4 of the first to third embodiments of the present invention. The filter 51 such as a low pass filter and an infrared cut filter is disposed between the first prism 3 and the CCD 49. An object image by the photographing optical system 48 is formed on an image pickup surface 50 of a CCD 49. The object image received by the CCD 49 is displayed, via the processor 52, on a liquid crystal display element (LCD) 60, as an electronic image. The processor 52 controls the recording element 61, which records the photographed object image on the CCD 49 as an electronic image. The displayed image on the LCD 60 is introduced to the eye E of the observer via the eyepiece optical system 59.

The eyepiece optical system 59 includes a decentered prism optical system 3, 4 having the configuration similar to the observation optical system of the first to third embodiments and a cover lens 91 disposed on the exit pupil side. Behind the LCD 60, a backlight 92 is disposed to illuminate it. The photographing objective optical system 48 may further include another lens (positive lens, negative lens) on the object side or on the image side of the two prisms 3, 4.

The camera 40 having the above-described configuration is advantageous in that the photographing objective optical system 48 and the eyepiece optical system 59 can be constructed of a small number of optical members and thus facilitate high performance and cost reduction. Also, since the entire optical system can be arranged on a same plane, thickness in the direction perpendicular to this plane can be reduced.

In the configuration shown in FIG. 18, the positive lens is used as the cover member 65 of the photographing objective optical system 48. However, a negative lens or a plane parallel plate may be used instead of the positive lens.

It is possible to use the most object side surface of the photographing optical system according to the present invention (i.e. the entrance surface $3_1$ of the first prism 3) as a cover member also without providing an additional cover member. However, since the entrance surface $3_1$ is decentered with respect to the optical axis, if it is arranged on the front face of the camera, a person to be photographed would feel that the photographing center of the camera 40 is shifted from him (it is natural to recognize the photographing target to be along the perpendicular to the entrance surface at the center thereof). Therefore, if the most object side surface of the imaging optical system is decentered as in the present invention, it is desirable to provide a cover member 65 (or a cover lens 54) so that a person can be photographed, as by a normal type camera, without feeling strange.

Also, since a holographic element is applied to the entrance surface $3_1$ of the prism 3, providing the cover member 65 and the cover lens 91 is desirable in view of preventing a change in peak wavelength for diffraction caused by water from outside, also.

Figure 19A:
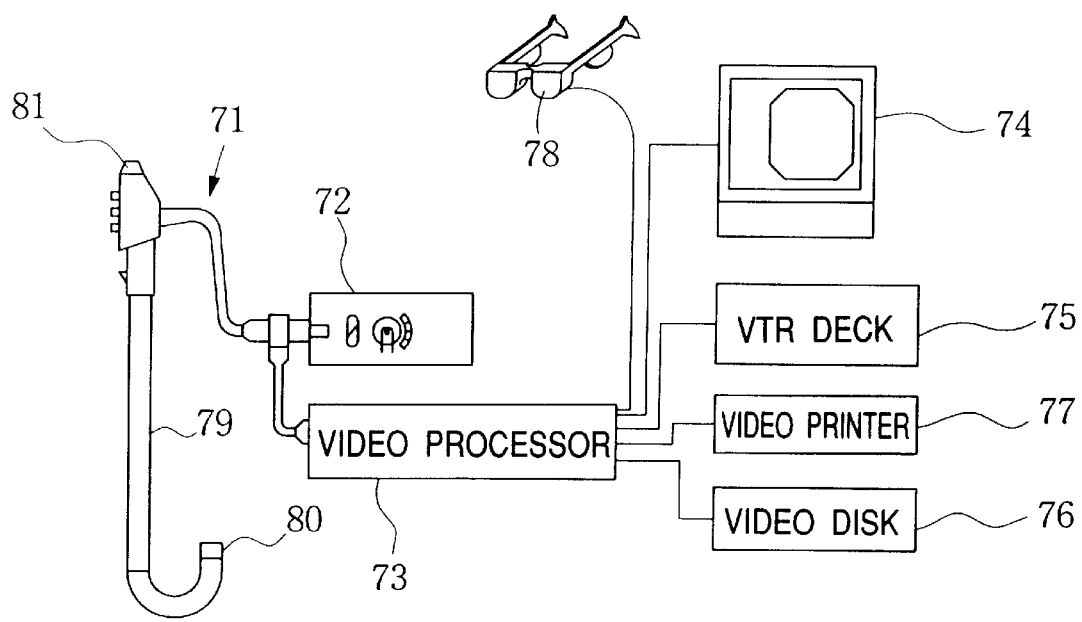
FIG. 19A is a schematic view showing the configuration of an electronic endoscope system which includes an electronic endoscope incorporating therein the photographing optical system and the observation optical system according to the present invention.
Figure 19B:
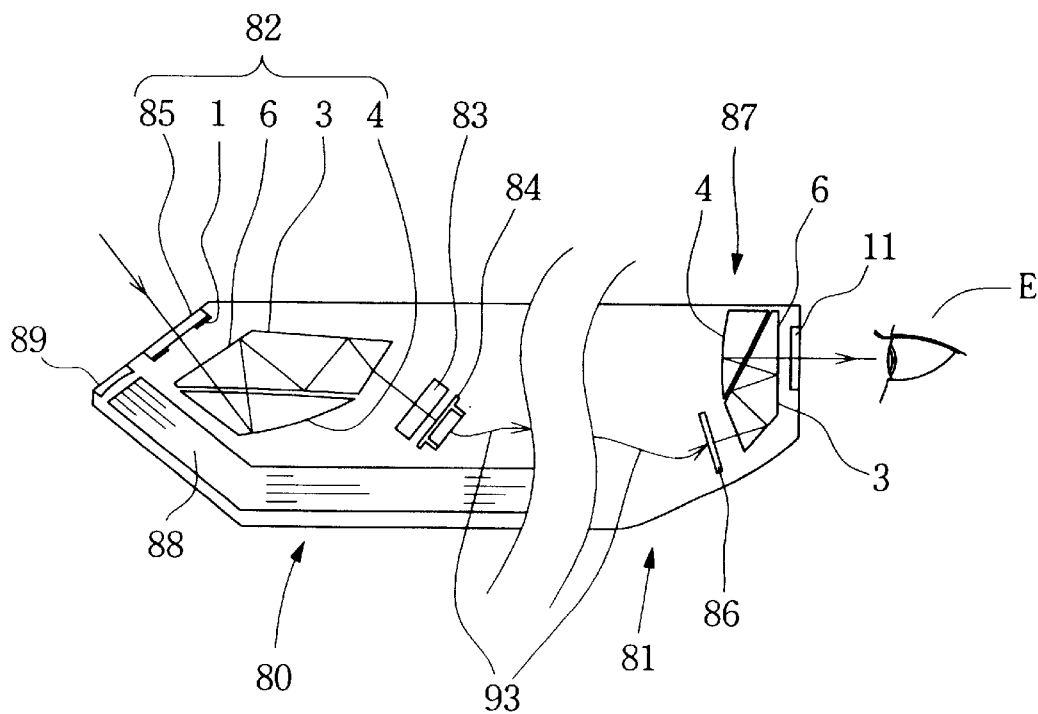
FIG. 19B is a schematic view showing the configuration of the photographing optical system and the observation optical system housed in the endoscope of FIG. 19A.

The present invention is applicable to an endoscope system. As shown in FIG. 19B, the photographing optical system of the present invention is incorporated into an objective optical system 82 of an observation system of an electronic endoscope, and the observation optical system of the present invention is incorporated into an eyepiece optical system 87 of the observation system of the electronic endoscope. In this application, the objective optical system 82 and the eyepiece optical system 87 employ optical systems which are configured substantially the same as those of the first to third embodiments. As shown in FIG. 19A, the electronic endoscope system includes an electronic endoscope 71, a light source unit 72 which provides illumination light, a video processor 73 which performs signal processing in response to the electronic endoscope 71, a monitor 74 which displays a video signal outputted from the video processor 73, a VTR deck 75 and a video disk 76 which are connected to the video processor 73 and which record the video signal, a video printer 77 which prints out the video signal as an image, and a head-mount type image display apparatus (HMD) 78 as shown, for example, in FIG. 12. An inserting section 79, a distal end section 80, and an eyepiece section 81 of the electronic endoscope 71 are configured as shown in FIG. 19B.

A beam of light emanating from the light source unit 72 is introduced, for illumination, into a portion under observation by an objective optical system 89 of an illumination system via a light guide fiber bundle 88. Light reflected back from the portion under observation is formed as an object image by the objective optical system 82 of the observation system via a cover member 85. The object image is formed on an image pickup surface of a CCD 84 via a filter 83 such as a low-pass filter and an infrared cut filter. The CCD 84 converts the object image into a video signal, which is, via the video processor 73, directly displayed on the monitor 74 as it is, is recorded in the video deck 75 and the video disk 76, is printed out from the video printer 77 as an image, and is displayed on the image display element 5 (FIG. 13) of the HMD 78 to be provided for an observer who wears the HMD 78. Simultaneously, the video signal converted by the CCD 84 is displayed, as an electronic image, on a liquid crystal display element (LCD) 86 in the eyepiece section 81 via an image signal transmitter 93. The displayed image there is introduced to the eye E of the observer via the eyepiece optical system 87 constructed of the observation optical system of the present invention.

The endoscope thus configured can be constructed of a small number of optical members and thus facilitates high performance and cost reduction. Also, since the objective optical system 82 is arranged in the longitudinal direction of the endoscope, the above-mentioned effects can be attained without obstructing size reduction in diameter of the endoscope.

What is claimed is:

1. An optical system disposed between a pupil surface and an image surface, said optical system comprising:

a first prism; and a second prism, wherein said first prism comprises:

a $1^{st}$-$1^{st}$ surface which is disposed on a side of the pupil surface and which has both of an action of transmitting first bundles of rays, which are defined as bundles of rays travelling along a path between the pupil surface and the image surface via said optical system, and an action of reflecting the first bundles of rays;

a $1^{st}$-$2^{nd}$ surface which is disposed on an opposite side of the pupil surface with respect to said $1^{st}$-$1^{st}$ surface and which has both of an action of transmitting the first bundles of rays and an action of reflecting the first bundles of rays; and a $1^{st}$-$3^{rd}$ surface which is disposed on a side of the image surface and which transmits the first bundles of rays, wherein said second prism comprises:

a $2^{nd}$-$1^{st}$ surface which is disposed adjacent to said $1^{st}$-$2^{nd}$ surface at an air space away and which transmits the first bundles of rays at least twice; and a $2^{nd}$-$2^{nd}$ surface which is disposed on an opposite side of the pupil surface with respect to said $2^{nd}$-$1^{st}$ surface and which reflects the first bundles of rays, wherein said $1^{st}$-$1^{st}$ surface of said first prism is constructed of a prism face of said first prism to which a holographic element is applied, wherein said holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays, and wherein said $1^{st}$-$2^{nd}$ surface of said first prism is constructed and arranged such that a part of the first bundles of rays that are incident thereon at angles greater than a critical angle is totally reflected therefrom and that a remaining part of the first bundles of rays that are incident thereon at angles equal to or smaller than the critical angle is transmitted therethrough, to thereby have both of the action of reflecting the first bundles of rays and the action of transmitting the first bundles of rays.

2. An optical system according to claim 1, wherein said $1^{st}$-$2^{nd}$ surface of said first prism and said $2^{nd}$-$1^{st}$ surface of said second prism are congruently shaped so that a path of rays can be formed such that a chromatic aberration of the first bundles of rays passing through the air space between said $1^{st}$-$2^{nd}$ surface and said $2^{nd}$-$1^{st}$ surface is prevented from being degraded.

3. An optical system according to claim 2, wherein said $1^{st}$-$2^{nd}$ surface of said first prism and said $2^{nd}$-$1^{st}$ surface of said second prism are shaped as plane surfaces.

4. An optical system according to claim 3, wherein the following condition is satisfied:

$$1 \times 10^{-3} \text{ (mm)} < M < 3 \text{ (mm)}$$

where M is the air space between said $1^{st}$-$2^{nd}$ surface of said first prism and said $2^{nd}$-$1^{st}$ surface of said second prism.

5. An optical system according to claim 3, wherein the following condition is satisfied:

$$1 \times 10^{-2} \text{ (mm)} < M < 2 \text{ (mm)}$$

where M is the air space between said $1^{st}$-$2^{nd}$ surface of said first prism and said $2^{nd}$-$1^{st}$ surface of said second prism.

6. An optical system according to claim 3, wherein the following condition is satisfied:

$$7 \times 10^{-1} \text{ (mm)} < M < 1.5 \text{ (mm)}$$

where M is the air space between said $1^{st}$-$2^{nd}$ surface of said first prism and said $2^{nd}$-$1^{st}$ surface of said second prism.

7. An optical system according to claim 3, wherein at least one of said $1^{st}$-$2^{nd}$ surface of said first prism and said $2^{nd}$-$1^{st}$ surface of said second prism is provided with an anti-reflection coating so as to prevent generation of a ghost.

8. An optical system according to claim 2, wherein said $1^{st}$-$2^{nd}$ surface of said first prism and said $2^{nd}$-$1^{st}$ surface of said second prism are shaped as curved surfaces.

9. An optical system according to claim 8, wherein the following condition is satisfied:

$$1 \times 10^{-3} \text{ (mm)} < M < 3 \text{ (mm)}$$

where M is the air space between said $1^{st}$-$2^{nd}$ surface of said first prism and said $2^{nd}$-$1^{st}$ surface of said second prism.

10. An optical system according to claim 8, wherein the following condition is satisfied:

$$1 \times 10^{-2} \text{ (mm)} < M < 2 \text{ (mm)}$$

where M is the air space between said $1^{st}$-$2^{nd}$ surface of said first prism and said $2^{nd}$-$1^{st}$ surface of said second prism.

11. An optical system according to claim 8, wherein the following condition is satisfied:

$$7 \times 10^{-1} \text{ (mm)} < M < 1.5 \text{ (mm)}$$

where M is the air space between said $1^{st}$-$2^{nd}$ surface of said first prism and said $2^{nd}$-$1^{st}$ surface of said second prism.

12. An optical system according to claim 8, wherein at least one of said $1^{st}$-$2^{nd}$ surface of said first prism and said $2^{nd}$-$1^{st}$ surface of said second prism is provided with an anti-reflection coating so as to prevent generation of a ghost.

13. An optical system according to claim 1, wherein a medium of said second prism is liquid and a reflecting surface included in said second prism is formed as a deformable mirror, so that said second prism acts as a focusing system.

14. An observation optical system comprising:
  an optical system which is disposed between a pupil surface and an image surface and which comprises a first prism and a second prism; and
  an image display element disposed on the image surface to display thereon an image to be viewed by an observer,
  wherein an exit pupil is formed on the pupil surface so that an eye of the observer is positioned thereat,
  wherein said first prism comprises:
    a $1^{st}$-$1^{st}$ surface which is disposed on a side of the pupil surface and which has both of an action of transmitting first bundles of rays, which are defined as bundles of rays travelling along a path between the pupil surface and the image surface via said optical system, and an action of reflecting the first bundles of rays;
    a $1^{st}$-$2^{nd}$ surface which is disposed on an opposite side of the pupil surface with respect to said $1^{st}$-$1^{st}$ surface and which has both of an action of transmitting the first bundles of rays and an action of reflecting the first bundles of rays; and
    a $1^{st}$-$3^{rd}$ surface which is disposed on a side of the image surface and which transmits the first bundles of rays,
  wherein said second prism comprises:
    a $2^{nd}$-$1^{st}$ surface which is disposed adjacent to said $1^{st}$-$2^{nd}$ surface at an air space away and which transmits the first bundles of rays at least twice; and
    a $2^{nd}$-$2^{nd}$ surface which is disposed on an opposite side of the pupil surface with respect to said $2^{nd}$-$1^{st}$ surface and
  which reflects the first bundles of rays,
  wherein said $1^{st}$-$1^{st}$ surface of said first prism is constructed of a prism face of said first prism to which a holographic element is applied,
  wherein said holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays,
  wherein said $1^{st}$-$2^{nd}$ surface of said first prism is constructed and arranged such that a part of the first bundles of rays that rare incident thereon at angles greater than a critical angle is totally reflected therefrom and that a remaining part of the first bundles of rays that are incident thereon at angles equal to or smaller than the critical angle is transmitted therethrough, to thereby have both of the action of reflecting the first bundles of rays and the action of transmitting the first bundles of rays, and
  wherein said observation optical system is constructed and arranged so that the first bundles of rays emergent from the image display element enter said first prism as being transmitted through said $1^{st}$-$3^{rd}$ surface, are then totally reflected from said $1^{st}$-$2^{nd}$ surface, are then reflected from said $1^{st}$-$1^{st}$ surface by diffraction, then exit from said first prism as being transmitted through said $1^{st}$-$2^{nd}$ surface, then enter said second prism as being transmitted through said $2^{nd-1st}$ surface, are then reflected from said $2^{nd}$-$2^{nd}$ surface, then exit from said second prism as being transmitted through said $2^{nd}$-$1^{st}$ surface, then re-enter said first prism as being transmitted through said $1^{st}$-$2^{nd}$ surface, and then exit from said first prism as being transmitted through said $1^{st}$-$1^{st}$ surface, to be introduced to the exit pupil.

15. An observation optical system according to claim 14, wherein said $1^{st}$-$2^{nd}$ surface of said first prism and said $2^{nd}$-$1^{st}$ surface of said second prism are congruently shaped so that a path of rays can be formed such that a chromatic aberration of the first bundles of rays passing through the air space between said $1^{st}$-$2^{nd}$ surface and said $2^{nd}$-$1^{st}$ surface is prevented from being degraded.

16. An observation optical system according to claim 15, wherein said $1^{st}$-$2^{nd}$ surface of said first prism and said $2^{nd}$-$1^{st}$ surface of said second prism are shaped as plane surfaces.

17. An observation optical system according to claim 16, wherein the following condition is satisfied:

$$1 \times 10^{-3} \text{ (mm)} < M < 3 \text{ (mm)}$$

where M is the air space between said $1^{st}$-$2^{nd}$ surface of said first prism and said $2^{nd}$-$1^{st}$ surface of said second prism.

18. An observation optical system according to claim 16, wherein the following condition is satisfied:

$$1 \times 10^{-2} \text{ (mm)} < M < 2 \text{ (mm)}$$

where M is the air space between said $1^{st}$-$2^{nd}$ surface of said first prism and said $2^{nd}$-$1^{st}$ surface of said second prism.

19. An observation optical system according to claim 16, wherein the following condition is satisfied:

$$7 \times 10^{-1} \text{ (mm)} < M < 1.5 \text{ (mm)}$$

where M is the air space between said $1^{st}$-$2^{nd}$ surface of said first prism and said $2^{nd}$-$1^{st}$ surface of said second prism.

20. An observation optical system according to claim 16, wherein at least one of said $1^{st}$-$2^{nd}$ surface of said first prism and said $2^{nd}$-$1^{st}$ surface of said second prism is provided with an anti-reflection coating so as to prevent generation of a ghost.

21. An observation optical system according to claim 15, wherein said $1^{st}$-$2^{nd}$ surface of said first prism and said $2^{nd}$-$1^{st}$ surface of said second prism are shaped as curved surfaces.

22. An observation optical system according to claim 21, wherein the following condition is satisfied:

$$1 \times 10^{-3} \text{ (mm)} < M < 3 \text{ (mm)}$$

where M is the air space between said $1^{st}$-$2^{nd}$ surface of said first prism and said $2^{nd}$-$3^{rd}$ surface of said second prism.

23. An observation optical system according to claim 21, wherein the following condition is satisfied:

$$1 \times 10^{-2} \text{ (mm)} < M < 2 \text{ (mm)}$$

where M is the air space between said $1^{st}$-$2^{nd}$ surface of said first prism and said $2^{nd}$-$1^{st}$ surface of said second prism.

24. An observation optical system according to claim 21, wherein the following condition is satisfied:

$$7 \times 10^{-1} \text{ (mm)} < M < 1.5 \text{ (mm)}$$

where M is the air space between said $1^{st}$-$2^{nd}$ surface of said first prism and said $2^{nd}$-$1^{st}$ surface of said second prism.

25. An observation optical system according to claim 21, wherein at least one of said $1^{st}$-$2^{nd}$ surface of said first prism and said $2^{nd}$-$1^{st}$ surface of said second prism is provided with an anti-reflection coating so as to prevent generation of a ghost.

26. An observation optical system according to claim 14, further comprising an optical member disposed between said $1^{st}$-$3^{rd}$ surface of said first prism and said image display element.

27. An observation optical system according to claim 14, further comprising an optical member disposed between said $1^{st}$-$1^{st}$ surface of said first prism and the exit pupil.

28. An observation optical system according to claim 14, wherein said first prism further comprises a reflecting surface arranged in a path from said $1^{st}$-$3^{rd}$ surface to said $1^{st}$-$2^{nd}$ surface so as to direct the first bundles of rays to said $1^{st}$-$2^{nd}$ surface by reflection.

29. An observation optical system according to claim 14, wherein said second prism further comprises a reflecting surface arranged in a path from said $2^{nd}$-$1^{st}$ surface to said $2^{nd}$-$2^{nd}$ surface so as to direct said first bundles of rays to said $2^{nd}$-$2^{nd}$ surface by reflection.

30. An observation optical system according to claim 14, wherein said prism face of said first prism is shaped as a plane base surface and said holographic element is applied to said plane base surface, to form said $1^{st}$-$1^{st}$ surface.

31. An observation optical system according to claim 30, wherein said holographic element is constructed of a volume hologram.

32. An observation optical system according to claim 14, wherein said prism face of said first prism is shaped as a curved base surface and said holographic element is applied to said curved base surface, to form said $1^{st}$-$1^{st}$ surface.

33. An observation optical system according to claim 32, wherein said holographic element is constructed of a volume hologram.

34. An observation optical system according to claim 14, wherein said image display element is arranged such that the following condition is satisfied:

$$40(°) < |\theta| < 100(°)$$

where $\theta$ is an angle formed between a perpendicular to a display surface of said image display element and a visual axis, which is defined to be an axial chief ray as it passes through the exit pupil, the axial chief ray being defined to be a ray travelling between a center of the pupil surface and the center of the image surface.

35. An observation optical system according to claim 14, wherein said image display element is arranged such that the following condition is satisfied:

$$60(°) < |\theta| < 85(°)$$

where $\theta$ is an angle formed between a perpendicular to a display surface of said image display element and a visual axis, which is defined to be an axial chief ray as it passes through the exit pupil, the axial chief ray being defined to be a ray travelling between a center of the pupil surface and the center of the image surface.

36. An observation optical system according to claim 14, wherein said image display element is arranged such that the following condition is satisfied:

$$65(°) < |\theta| < 73(°)$$

where $\theta$ is an angle formed between a perpendicular to a display surface of said image display element and a visual axis, which is defined to be an axial chief ray as it passes through the exit pupil, the axial chief ray being defined to be a ray travelling between a center of the pupil surface and the center of the image surface.

37. An observation optical system according to claim 14, wherein said $2^{nd}$-$2^{nd}$ surface of said second prism is constructed and arranged such that a part of second bundles of rays that are incident thereon at angles greater than a critical angle is totally reflected therefrom and that a remaining part of the second bundles of rays that are incident thereon at angles equal to or smaller than the critical angle is transmitted therethrough, said second bundles of rays being defined to be effective bundles of rays that travel in a path between said $2^{nd}$-$1^{st}$ surface and an opposite side of said $2^{nd}$-$1^{st}$ surface with respect to said $2^{nd}$-$2^{nd}$ surface.

38. An observation optical system according to claim 37, further comprising an optical member which transmits light and which is disposed on a side of said $2^{nd}$-$2^{nd}$ surface of said second prism.

39. A head-mount image display apparatus comprising:

a main frame in which an observation optical system provided with an exit pupil is arranged;

a support member which holds said main frame to a head of an observer so that the exit pupil of said observation optical system coincides with an eye of the observer; and a speaker member which provides voice for an ear of the observer, wherein said observation optical system comprises:
an optical system which is disposed between a pupil surface and an image surface and which comprises a first prism and a second prism; and
an image display element disposed on the image surface to display thereon an image to be viewed by the observer, wherein said exit pupil is formed on the pupil surface so that the eye of the observer is positioned thereat, wherein said first prism comprises:
a $1^{st}$-$1^{st}$ surface which is disposed on a side of the pupil surface and which has both of an action of transmitting first bundles of rays, which are defined as bundles of rays travelling along a path between the pupil surface and the image surface via said optical system, and an action of reflecting the first bundles of rays;
a $1^{st}$-$2^{nd}$ surface which is disposed on an opposite side of the pupil surface with respect to said $1^{st}$-$1^{st}$ surface and which has both of an action of transmitting the first bundles of rays and an action of reflecting the first bundles of rays; and
a $1^{st}$-$3^{rd}$ surface which is disposed on a side of the image surface and which transmits the first bundles of rays, wherein said second prism comprises:
a $2^{nd}$-$1^{st}$ surface which is disposed adjacent to said $1^{st}$-$2^{nd}$ surface at an air space away and which transmits the first bundles of rays at least twice; and
a $2^{nd}$-$2^{nd}$ surface which is disposed on an opposite side of the pupil surface with respect to said $2^{nd}$-$1^{st}$ surface and which reflects the first bundles of rays, wherein said $1^{st}$-$1^{st}$ surface of said first prism is constructed of a prism face of said first prism to which a holographic element is applied, wherein said holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays, wherein said $1^{st}$-$2^{nd}$ surface of said first prism is constructed and arranged such that a part of the first bundles of rays that are incident thereon at angles greater than a critical angle is totally reflected therefrom and that a remaining part of the first bundles of rays that are incident thereon at angles equal to or smaller than the critical angle is transmitted therethrough, to thereby have both of the action of reflecting the first bundles of rays and the action of transmitting the first bundles of rays, and wherein said observation optical system is constructed and arranged so that the first bundles of rays emergent from the image display element enter said first prism as being transmitted through said $1^{st}$-$3^{rd}$ surface, are then totally reflected from said $1^{st}$-$2^{nd}$ surface, are then reflected from said $1^{st}$-$1^{st}$ surface by diffraction, then exit from said first prism as being transmitted through said $1^{st}$-$2^{nd}$ surface, then enter said second prism as being transmitted through said $2^{nd}$-$1^{st}$ surface, are then reflected from said $2^{nd}$-$2^{nd}$ surface, then exit from said second prism as being transmitted through said $2^{nd}$-$1^{st}$ surface, then re-enter said first prism as being transmitted through said $1^{st}$-$2^{nd}$ surface, and then exit from said first prism as being transmitted through said $1^{st}$-$1^{st}$ surface, to be introduced to the exit pupil.

40. A head-mount image display apparatus according to claim 39, wherein said speaker member is constructed of an earphone.

41. A head-mount image display apparatus comprising:

a main frame in which a pair of observation optical systems each provided with an exit pupil are arranged;

a support member which holds said main frame to a head of an observer so that the exit pupils of said pair of observation optical systems coincide with a left eye and a right eye of the observer, respectively; and a pair of speaker members which provide voice for a left ear and a right ear of the observer, respectively, wherein each of said observation optical systems comprises:
an optical system which is disposed between a pupil surface and an image surface and which comprises a first prism and a second prism; and
an image display element disposed on the image surface to display thereon an image to be viewed by the observer, wherein said exit pupil is formed on the pupil surface so that the eye of the observer is positioned thereat, wherein said first prism comprises:
a $1^{st}$-$1^{st}$ surface which is disposed on a side of the pupil surface and which has both of an action of transmitting first bundles of rays, which are defined as bundles of rays travelling along a path between the pupil surface and the image surface via said optical system, and an action of reflecting the first bundles of rays;
a $1^{st}$-$2^{nd}$ surface which is disposed on an opposite side of the pupil surface with respect to said $1^{st}$-$1^{st}$ surface and which has both of an action of transmitting the first bundles of rays and an action of reflecting the first bundles of rays; and
a $1^{st}$-$3^{rd}$ surface which is disposed on a side of the image surface and which transmits the first bundles of rays, wherein said second prism comprises:
a $2^{nd}$-$1^{st}$ surface which is disposed adjacent to said $1^{st}$-$2^{nd}$ surface at an air space away and which transmits the first bundles of rays at least twice; and
a $2^{nd}$-$2^{nd}$ surface which is disposed on an opposite side of the pupil surface with respect to said $2^{nd}$-$1^{st}$ surface and which reflects the first bundles of rays, wherein said $1^{st}$-$1^{st}$ surface of said first prism is constructed of a prism face of said first prism to which a holographic element is applied, wherein said holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays, wherein said $1^{st}$-$2^{nd}$ surface of said first prism is constructed and arranged such that a part of the first bundles of rays that are incident thereon at angles greater than a critical angle is totally reflected therefrom and that a remaining part of the first bundles of rays that are incident thereon at angles equal to or smaller than the critical is transmitted therethrough, to thereby have both of the action of reflecting the first bundles of rays and the action of transmitting the first bundles of rays, and wherein said observation optical system is constructed and arranged so that the first bundles of rays emergent from the image display element enter said first prism as being transmitted through said $1^{st}$-$3^{rd}$ surface, are then totally reflected from said $1^{st}$-$2^{nd}$ surface, are then reflected from said $1^{st}$-$1^{st}$ surface by diffraction, then exit from said first prism as being transmitted through said $1^{st}$-$2^{nd}$ surface, then enter said second prism as being transmitted through said $2^{nd}$-$1^{st}$ surface, are then reflected from said $2^{nd}$-$2^{nd}$ surface, then exit from said second prism as being transmitted through said $2^{nd}$-$1^{st}$ surface, then re-enter said first prism as being transmitted through said $1^{st}$-$2^{nd}$ surface, and then exit from said first prism as being transmitted through said $1^{st}$-$1^{st}$ surface, to be introduced to the exit pupil.

42. A head-mount image display apparatus according to claim 41, wherein each of said speaker members is constructed of an earphone.

43. A photographing optical system comprising:
an optical system which is disposed between a pupil surface and an image surface and which comprises a first prism and a second prism;
an image pickup element disposed on the image surface for photographing an image of an object;
and an aperture stop disposed on the pupil surface for regulating brightness of light from the object;
wherein said first prism comprises:
a $1^{st}$-$1^{st}$ surface which is disposed on a pupil surface side and which has both of an action of transmitting first bundles of rays, which are defined as bundles of rays travelling along a path between the pupil surface and the image surface via said optical system, and an action of reflecting the first bundles of rays;
a $1^{st}$-$2^{nd}$ surface which is disposed on an opposite side of the pupil surface with respect to said $1^{st}$-$1^{st}$ surface and which has both of an action of transmitting the first bundles of rays and an action of reflecting the first bundles of rays; and
a $1^{st}$-$3^{rd}$ surface which is disposed on an image surface side and which transmits the first bundles of rays,
wherein said second prism comprises:
a $2^{nd}$-$1^{st}$ surface which is disposed adjacent to said $1^{st}$-$2^{nd}$ surface at an air space away and which transmits the first bundles of rays at least twice; and
a $2^{nd}$-$2^{nd}$ surface which is disposed on an opposite side of the pupil surface with respect to said $2^{nd}$-$1^{st}$ surface and which reflects the first bundles of rays,
wherein said $1^{st}$-$1^{st}$ surface of said first prism is constructed of a prism face of said first prism to which a holographic element is applied,
wherein said holographic element is constructed and arranged to transmit the first bundles of rays that are incident thereon at a first incident angle and to reflect by diffraction the first bundles of rays that are incident thereon at a second incident angle, to thereby have both of the action of reflecting the first bundles of rays and the action of transmitting the first bundles of rays, wherein said $1^{st}$-$2^{nd}$ surface of said first prism is constructed and arranged such that a part of the first bundles of rays that are incident thereon at angles greater than a critical angle is totally reflected therefrom and that a remaining part of the first bundles of rays that are incident thereon at angles equal to or smaller than the critical angle is transmitted therethrough, to thereby have both of the action of reflecting the first bundles of rays and the action of transmitting the first bundles of rays, and wherein said photographing optical system is constructed and arranged so that the light from the object passing through said aperture stop enters said first prism as being transmitted through said $1^{st}$-$1^{st}$ surface, once exits from said first prism as being transmitted through said $1^{st}$-$2^{nd}$ surface, then enters said second prism as being transmitted through said $2^{nd}$-$1^{st}$ surface, is then reflected from said $2^{nd}$-$2^{nd}$ surface, then exits from said second prism as being transmitted through said $2^{nd}$-$1^{st}$ surface, then re-enters said first prism as being transmitted through said $1^{st}$-$2^{nd}$ surface, is then reflected by diffraction from said $1^{st}$-$1^{st}$ surface, is then totally reflected from said $1^{st}$-$2^{nd}$ surface, and then exits from said first prism as being transmitted through said $1^{st}$-$3^{rd}$ surface, to be introduced to said image pickup element.

44. A photographing optical system according to claim 43, further comprising an optical member disposed between said $1^{st}$-$3^{rd}$ surface of said first prism and said image pickup element.

45. A photographing optical system according to claim 43, further comprising an optical member disposed between said $1^{st}$-$1^{st}$ surface of said first prism and said aperture stop.

46. A photographing optical system according to claim 43, wherein said first prism further comprises a reflecting surface arranged in a path from said $1^{st}$-$2^{nd}$ surface to said $1^{st}$-$3^{rd}$ surface so as to direct the first bundles of rays to said $1^{st}$-$3^{rd}$ surface by reflection.

47. A photographing optical system according to claim 43, wherein said second prism further comprises a reflecting surface arranged in a path from said $2^{nd}$-$2^{nd}$ surface to said $2^{nd}$-$1^{st}$ surface so as to direct said first bundles of rays to said $2^{nd}$-$1^{st}$ surface by reflection.

48. A photographing optical system according to claim 43, wherein said prism face of said first prism is shaped as a plane base surface and said holographic element is applied to said plane base surface, to form said $1^{st}$-$1^{st}$ surface.

49. A photographing optical system according to claim 48, wherein said holographic element is constructed of a volume hologram.

50. A photographing optical system according to claim 43, wherein said prism face of said first prism is shaped as a curved base surface and said holographic element is applied to said curved base surface, to form said $1^{st}$-$1^{st}$ surface.

51. A photographing optical system according to claim 50, wherein said holographic element is constructed of a volume hologram.

52. A photographing optical system according to claim 43, wherein said $1^{st}$-$2^{nd}$ surface of said first prism and said $2^{nd}$-$1^{st}$ surface of said second prism are congruently shaped so that a path of rays can be formed such that a chromatic aberration of the first bundles of rays passing through the air space between said $1^{st}$-$2^{nd}$ surface and said $2^{nd}$-$1^{st}$ surface is prevented from being degraded.

53. A photographing optical system according to claim 52, wherein said $1^{st}$-$2^{nd}$ surface of said first prism and said $2^{nd}$-$1^{st}$ surface of said second prism are shaped as plane surfaces.

54. A photographing optical system according to claim 53, wherein the following condition is satisfied:

$$1\times10^{-3}\ (mm) < M < 3\ (mm)$$

where M is the air space between said $1^{st}$-$2^{nd}$ surface of said first prism and said $2^{nd}$-$1^{st}$ surface of said second prism.

55. A photographing optical system according to claim 53, wherein the following condition is satisfied:

$$1\times10^{-2}\ (mm) < M < 2\ (mm)$$

where M is the air space between said $1^{st}$-$2^{nd}$ surface of said first prism and said $2^{nd}$-$1^{st}$ surface of said second prism.

56. A photographing optical system according to claim 53, wherein the following condition is satisfied:

$$7\times10^{-1}\ (mm) < M < 1.5\ (mm)$$

where M is the air space between said $1^{st}$-$2^{nd}$ surface of said first prism and said $2^{nd}$-$1^{st}$ surface of said second prism.

57. A photographing optical system according to claim 53, wherein at least one of said $1^{st}$-$2^{nd}$ surface of said first prism and said $2^{nd}$-$1^{st}$ surface of said second prism is provided with an anti-reflection coating so as to prevent generation of a ghost.

58. A photographing optical system according to claim 52, wherein said $1^{st}$-$2^{nd}$ surface of said first prism and said $2^{nd}$-$1^{st}$ surface of said second prism are shaped as curved surfaces.

59. A photographing optical system according to claim 58, wherein the following condition is satisfied:

$$1\times10^{-3}\ (mm) < M < 3\ (mm)$$

where M is the air space between said $1^{st}$-$2^{nd}$ surface of said first prism and said $2^{nd}$-$1^{st}$ surface of said second prism.

60. A photographing optical system according to claim 58, wherein the following condition is satisfied:

$$1\times10^{-2}\ (mm) < M < 2\ (mm)$$

where M is the air space between said $1^{st}$-$2^{nd}$ surface of said first prism and said $2^{nd}$-$2^{nd}$ surface of said second prism.

61. A photographing optical system according to claim 58, wherein the following condition is satisfied:

$$7\times10^{-1}\ (mm) < M < 1.5\ (mm)$$

where M is the air space between said $1^{st}$-$2^{nd}$ surface of said first prism and said $2^{nd}$-$1^{st}$ surface of said second prism.

62. A photographing optical system according to claim 58, wherein at least one of said $1^{st}$-$2^{nd}$ surface of said first prism and said $2^{nd}$-$1^{st}$ surface of said second prism is provided with an anti-reflection coating so as to prevent generation of a ghost.

63. A photographing optical system according to claim 43, wherein said image pickup element is arranged such that the following condition is satisfied:

$$40(°) < |\theta| < 100\ (°)$$

where $\theta$ is an angle formed between a perpendicular to an image pickup surface of said image pickup element and a visual axis, which is defined to be an axial chief ray as it passes through said aperture stop, the axial chief ray being defined to be a ray travelling between a center of the pupil surface and the center of the image surface.

64. A photographing optical system according to claim 43, wherein said image pickup element is arranged such that the following condition is satisfied:

$$60(°) < |\theta| < 85(°)$$

where $\theta$ is an angle formed between a perpendicular to an image pickup surface of said image pickup element and a visual axis, which is defined to be an axial chief ray as it passes through said aperture stop, the axial chief ray being defined to be a ray travelling between a center of the pupil surface and the center of the image surface.

65. A photographing optical system according to claim 43, wherein said image pickup element is arranged such that the following condition is satisfied:

$$65(°) < |\theta| < 73(°)$$

where $\theta$ is an angle formed between a perpendicular to an image pickup surface of said image pickup element and a visual axis, which is defined to be an axial chief ray as it passes through said aperture stop, the axial chief ray being defined to be a ray travelling between a center of the pupil surface and the center of the image surface.

66. A photographing optical system according to claim 43, wherein a medium of said second prism is liquid and a reflecting surface included in said second prism is formed as a deformable mirror, so that said second prism acts as a focusing system.

* * * * *

UNITED STATES PATENT AND TRADEMARK OFFICE
CERTIFICATE OF CORRECTION

PATENT NO. : 6,512,635 B1
DATED : January 28, 2003
INVENTOR(S) : Takeyama

It is certified that error appears in the above-identified patent and that said Letters Patent is hereby corrected as shown below:

Column 35,
Line 30, replace entire claim 22 with corrected claim 22, as follows:
-- 22. An observation optical system according to claim 21, wherein the following condition is satisfied:
$$1 \times 10^{-3} \text{ (mm)} < M < 3 \text{ (mm)}$$
where M is the air space between said $1^{st}$-$2^{nd}$ surface of the first prism and said $2^{nd}$-$1^{st}$ surface of said second prism. --

Column 41,
Line 36, replace entire claim 60 with corrected claim 60, as follows:
-- 60. A photographing optical system according to claim 58, wherein the following condition is satisfied:
$$1 \times 10^{-2} \text{ (mm)} < M < 2 \text{ (mm)}$$
where M is the air space between said $1^{st}$-$2^{nd}$ surface of said first prism and said $2^{nd}$-$1^{st}$ surface of said second prism. --

Signed and Sealed this

Third Day of August, 2004

JON W. DUDAS
*Acting Director of the United States Patent and Trademark Office*